United States Patent
Mori

(10) Patent No.: US 8,219,066 B2
(45) Date of Patent: Jul. 10, 2012

(54) RECORDING APPARATUS FOR COMMUNICATING WITH A PLURALITY OF COMMUNICATION APPARATUSES, CONTROL METHOD THEREFOR, AND PROGRAM

(75) Inventor: Chisato Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 11/847,702

(22) Filed: Aug. 30, 2007

(65) Prior Publication Data
US 2008/0064377 A1 Mar. 13, 2008

(30) Foreign Application Priority Data

Sep. 7, 2006 (JP) .................................. 2006-243039
Mar. 8, 2007 (JP) .................................. 2007-058813

(51) Int. Cl.
*H04L 12/58* (2006.01)
*H04M 3/42* (2006.01)
*H04N 5/232* (2006.01)

(52) U.S. Cl. ............... 455/412.1; 455/414.1; 348/211.2; 348/211.11

(58) Field of Classification Search ............... 455/412.1, 455/414.1; 348/207.1, 207.11, 211.1, 211.2, 348/211.11, E7.088
See application file for complete search history.

(56) References Cited

U.S. PATENT DOCUMENTS

| | | | | |
|---|---|---|---|---|
| 6,389,423 B1 * | 5/2002 | Sakakura | ....................... | 707/613 |
| 6,597,907 B1 * | 7/2003 | Pruitt et al. | .................... | 455/423 |
| 6,622,004 B1 * | 9/2003 | Sonoda et al. | ............... | 455/3.05 |
| 6,704,847 B1 * | 3/2004 | Six et al. | ........................ | 711/151 |
| 6,754,509 B1 * | 6/2004 | Khan et al. | ................... | 455/556.1 |
| 7,023,972 B1 * | 4/2006 | Sakazume | .................... | 379/88.25 |
| 7,308,539 B2 * | 12/2007 | Fuhs et al. | ...................... | 711/141 |
| 7,432,956 B2 * | 10/2008 | Yang et al. | ................... | 348/218.1 |
| 7,702,873 B2 * | 4/2010 | Griess et al. | .................... | 711/170 |
| 2002/0091786 A1 * | 7/2002 | Yamaguchi et al. | .......... | 709/213 |
| 2002/0133675 A1 * | 9/2002 | Hirayama | ...................... | 711/150 |
| 2003/0002439 A1 * | 1/2003 | Lee et al. | ........................ | 370/229 |
| 2003/0117958 A1 * | 6/2003 | Nation et al. | .................. | 370/235 |
| 2003/0185540 A1 * | 10/2003 | Fujita | ................................ | 386/46 |
| 2004/0003411 A1 * | 1/2004 | Nakai et al. | .................... | 725/105 |
| 2004/0051785 A1 * | 3/2004 | Yokonuma et al. | ....... | 348/207.99 |
| 2004/0192282 A1 * | 9/2004 | Vasudevan | ..................... | 455/419 |
| 2004/0229638 A1 * | 11/2004 | Zimba et al. | .................... | 455/514 |
| 2006/0174206 A1 * | 8/2006 | Jung et al. | ....................... | 715/751 |
| 2006/0187875 A1 * | 8/2006 | Bang | ............................. | 370/328 |
| 2006/0270418 A1 * | 11/2006 | Hannu et al. | ................... | 455/455 |
| 2007/0049341 A1 * | 3/2007 | Thoresson | ..................... | 455/558 |
| 2007/0072597 A1 * | 3/2007 | Peuziat et al. | ................. | 455/418 |
| 2007/0113031 A1 * | 5/2007 | Brown et al. | .................. | 711/160 |
| 2007/0150690 A1 * | 6/2007 | Chen et al. | ..................... | 711/170 |
| 2007/0243860 A1 * | 10/2007 | Aiello et al. | ................. | 455/414.3 |
| 2009/0058943 A1 * | 3/2009 | Silverbrook | ..................... | 347/49 |
| 2009/0221307 A1 * | 9/2009 | Wolak et al. | .................. | 455/466 |

FOREIGN PATENT DOCUMENTS

JP 2003-078950 3/2003
WO WO 2004088850 A1 * 10/2004

* cited by examiner

*Primary Examiner* — Christopher M Brandt
(74) *Attorney, Agent, or Firm* — Cowan, Liebowitz & Latman, P.C.

(57) ABSTRACT

This invention can reduce the load on a recording apparatus, efficiently design the overall system, and accurately calculate a data amount recordable on a recording unit in accordance with setting change of each communication apparatus or the like. A portable remote storage transmits information on a data amount storable in the portable remote storage to digital cameras. The information on the data amount storable in the portable remote storage is based on the remaining area of a shared storage area commonly available for the digital cameras except for an exclusive storage area assigned to each digital camera.

10 Claims, 44 Drawing Sheets

F I G. 5

| NUMBER OF RECORDING PIXELS \ COMPRESSION RATIO (KB / IMAGE) | SUPER FINE | FINE | NORMAL |
|---|---|---|---|
| L | 2002 | 1116 | 556 |
| M | 1002 | 558 | 278 |
| S | 570 | 320 | 170 |
| NUMBER OF RECORDING PIXELS \ FRAME RATE (KB / SEC) | SMOOTH | STANDARD | LIGHT |
| L | — | 2000 | 1000 |
| M | 1300 | 711 | 360 |
| S | — | — | 147 |
| BUFFER SIZE (MB) | 10 | | |

FIG. 6

| NUMBER OF RECORDING PIXELS \ COMPRESSION RATIO (KB/IMAGE) | | SUPER FINE | FINE | NORMAL |
|---|---|---|---|---|
| L | IMAGE DATA SIZE (KB/IMAGE) | 2002 | 1116 | 556 |
| L | TOTAL NUMBER OF SHOTS (TIMES) | 50 | 25 | 0 |
| M | IMAGE DATA SIZE (KB/IMAGE) | 1002 | 558 | 278 |
| M | TOTAL NUMBER OF SHOTS (TIMES) | 37 | 13 | 0 |
| S | IMAGE DATA SIZE (KB/IMAGE) | 570 | 320 | 170 |
| S | TOTAL NUMBER OF SHOTS (TIMES) | 0 | 0 | 0 |

| NUMBER OF RECORDING PIXELS \ FRAME RATE (KB/SEC) | | SMOOTH | STANDARD | LIGHT |
|---|---|---|---|---|
| L | IMAGE DATA SIZE (KB/SEC) | — | 2000 | 1000 |
| L | TOTAL SHOOTING TIME (SEC) | — | 360 | 0 |
| M | IMAGE DATA SIZE (KB/SEC) | 1300 | 711 | 360 |
| M | TOTAL SHOOTING TIME (SEC) | 560 | 168 | 0 |
| S | IMAGE DATA SIZE (KB/SEC) | — | — | 147 |
| S | TOTAL SHOOTING TIME (SEC) | — | — | 0 |

| BUFFER SIZE (MB) | 10 |
|---|---|

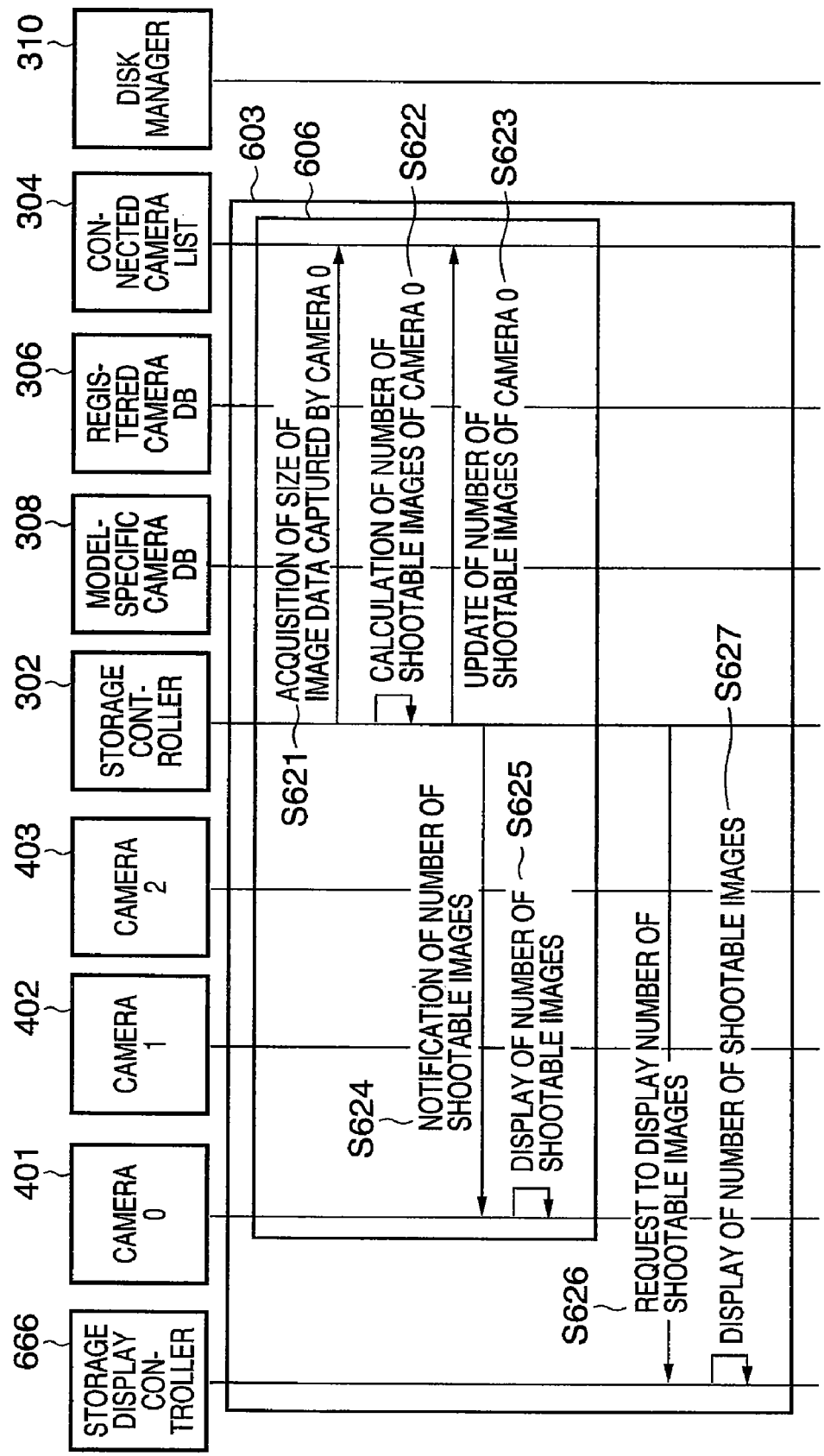

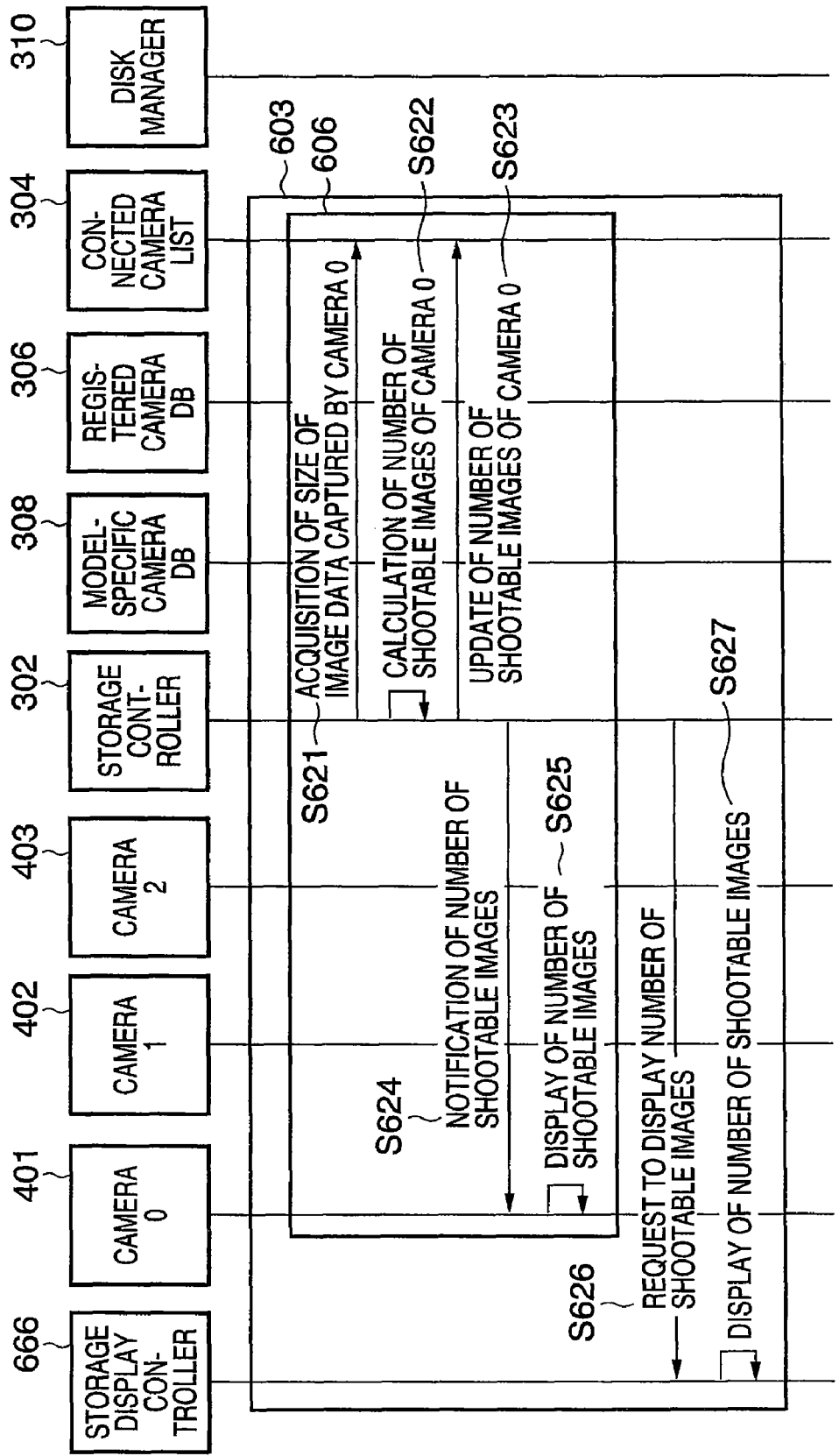

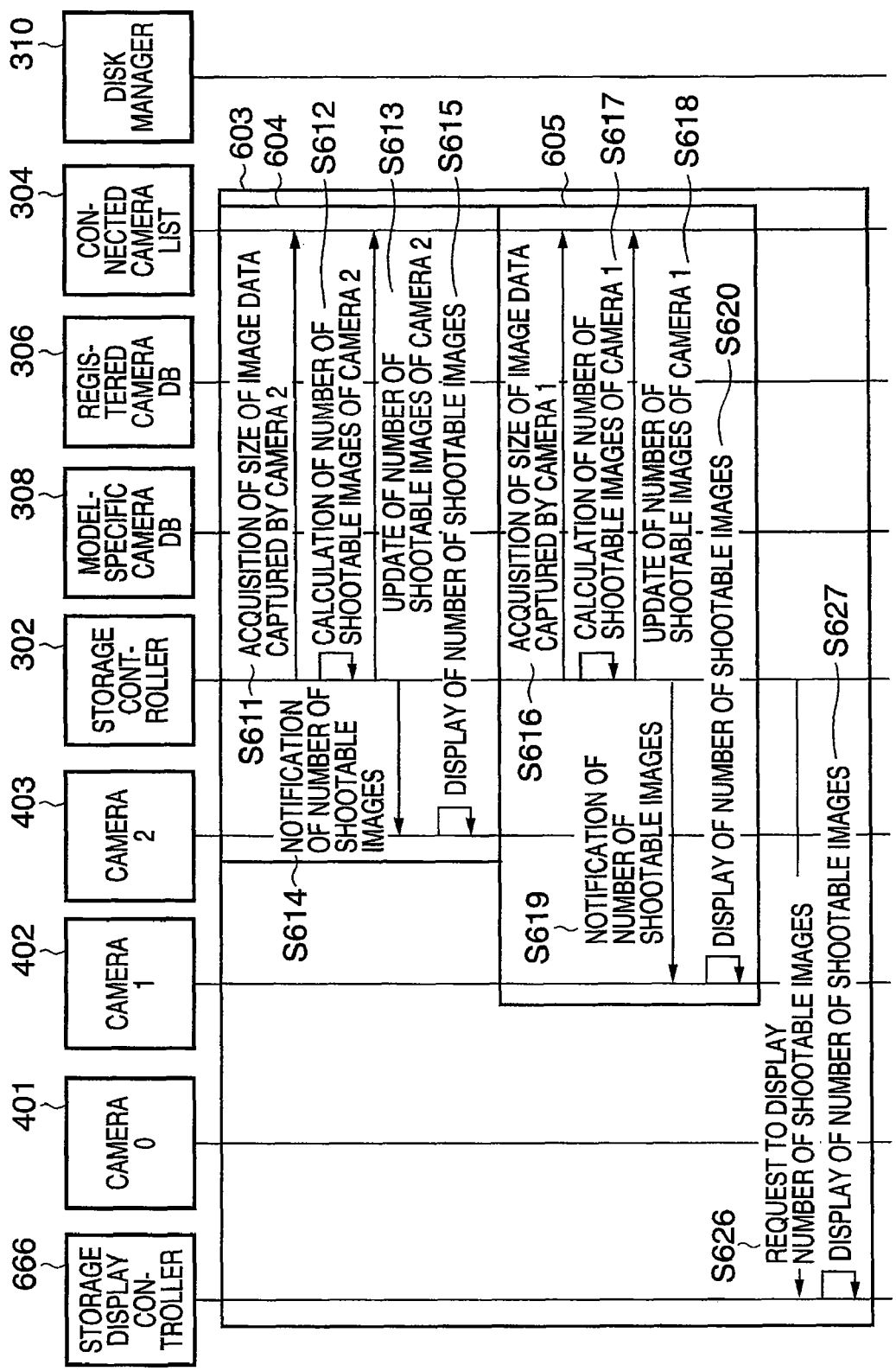

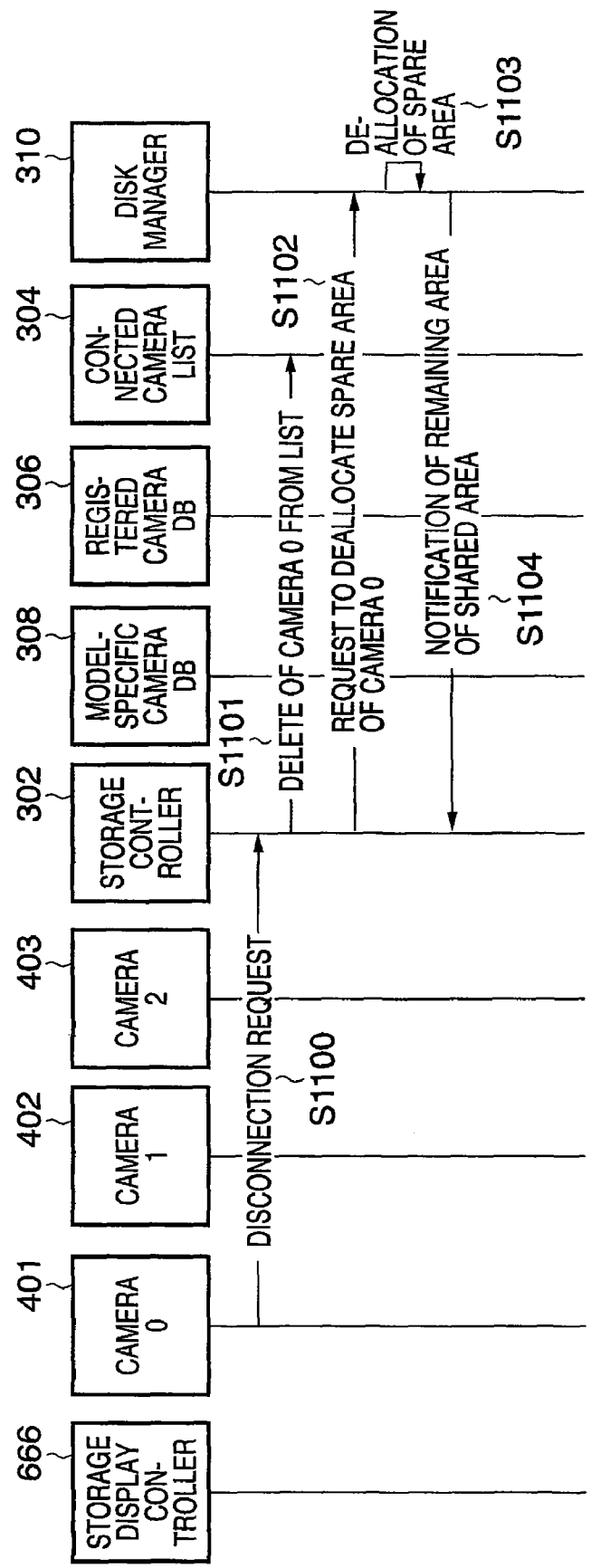

F I G. 19
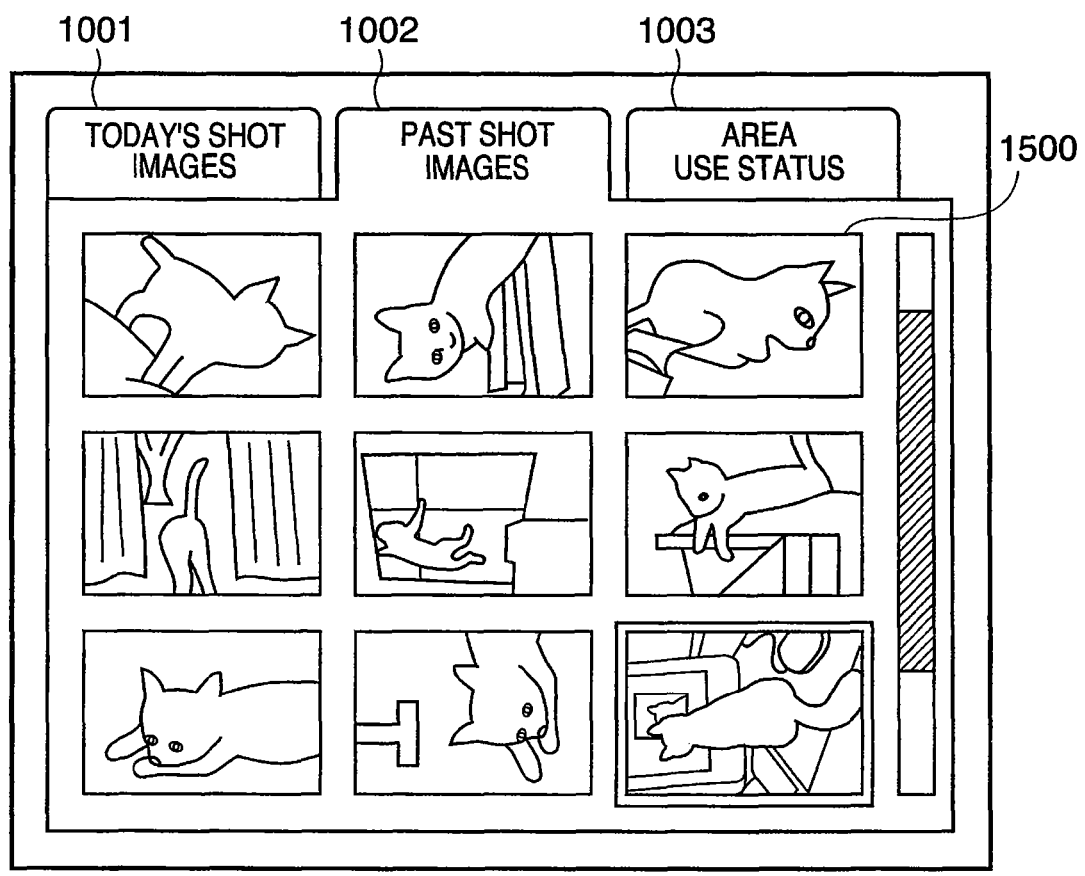

F I G. 23
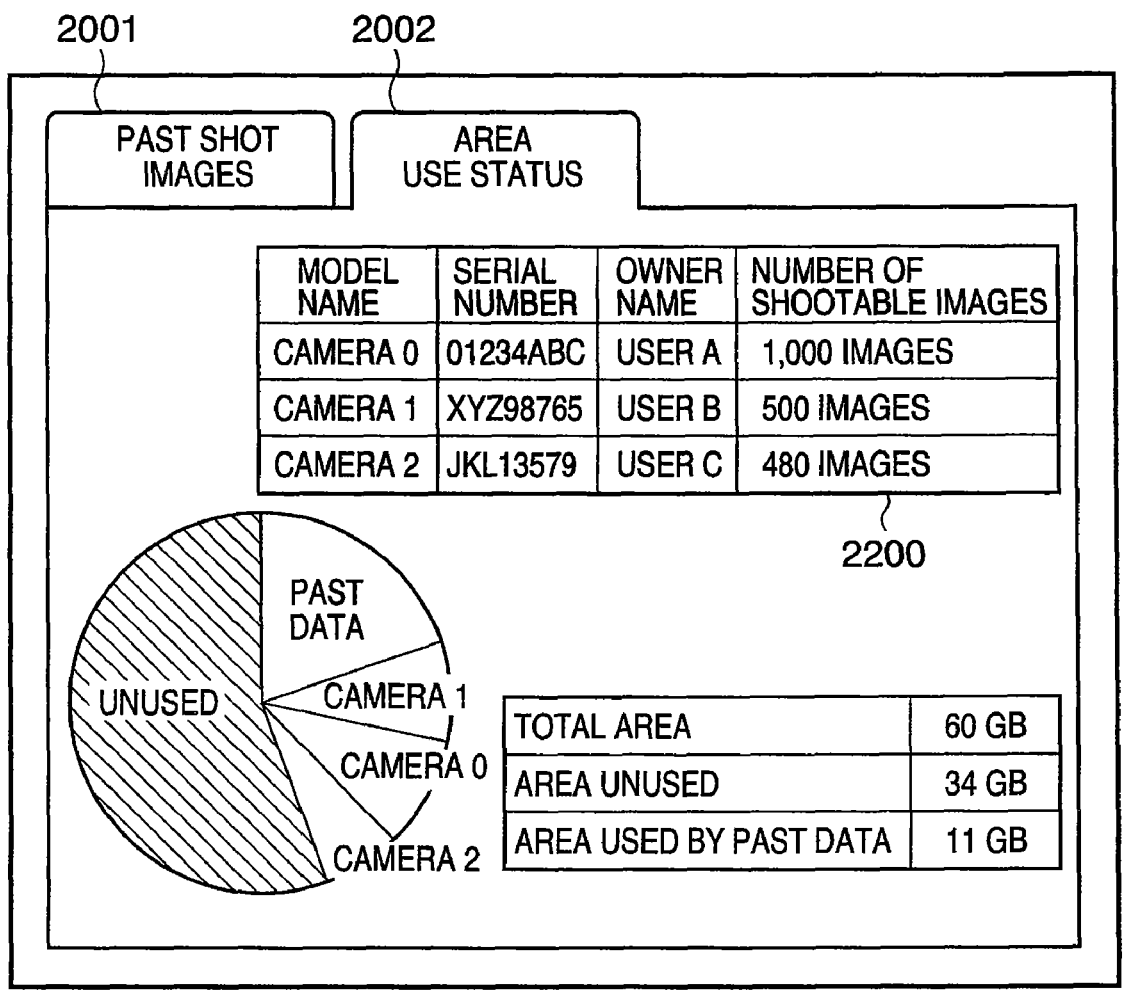

F I G. 25
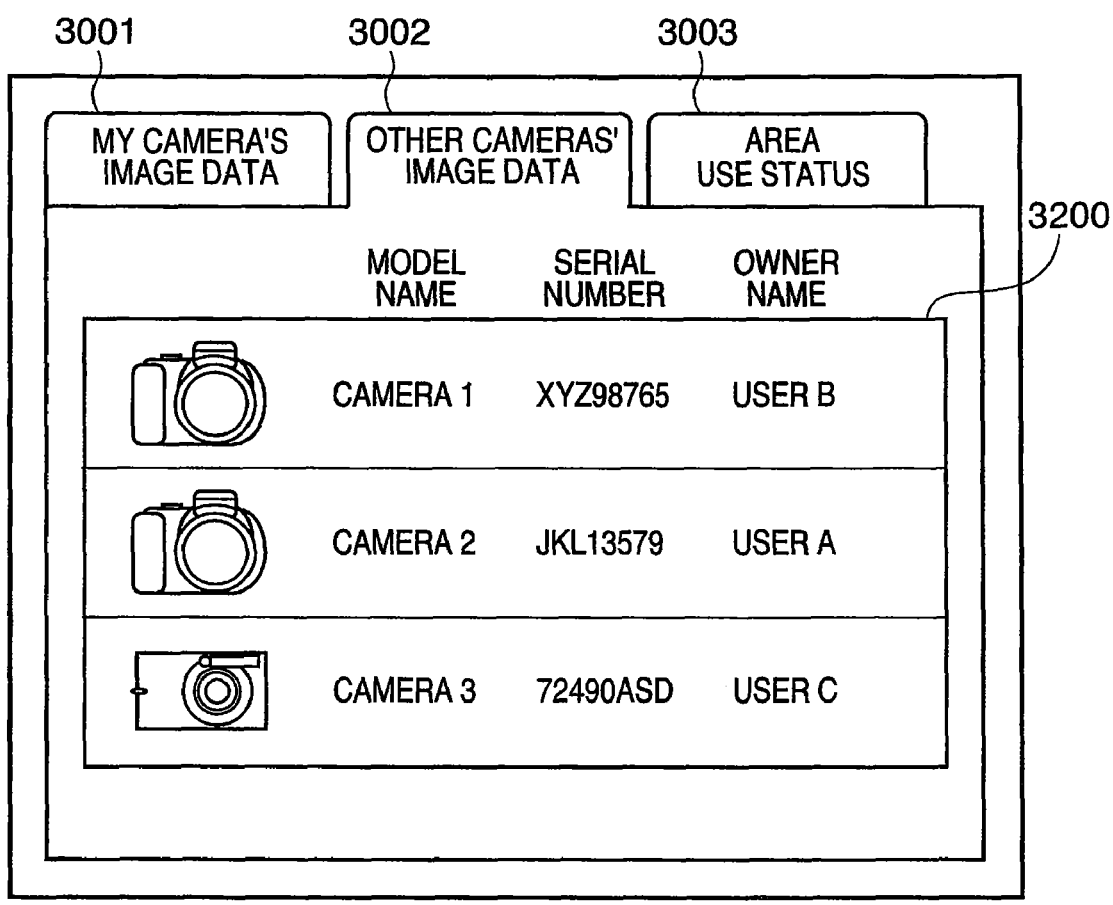

F I G. 27
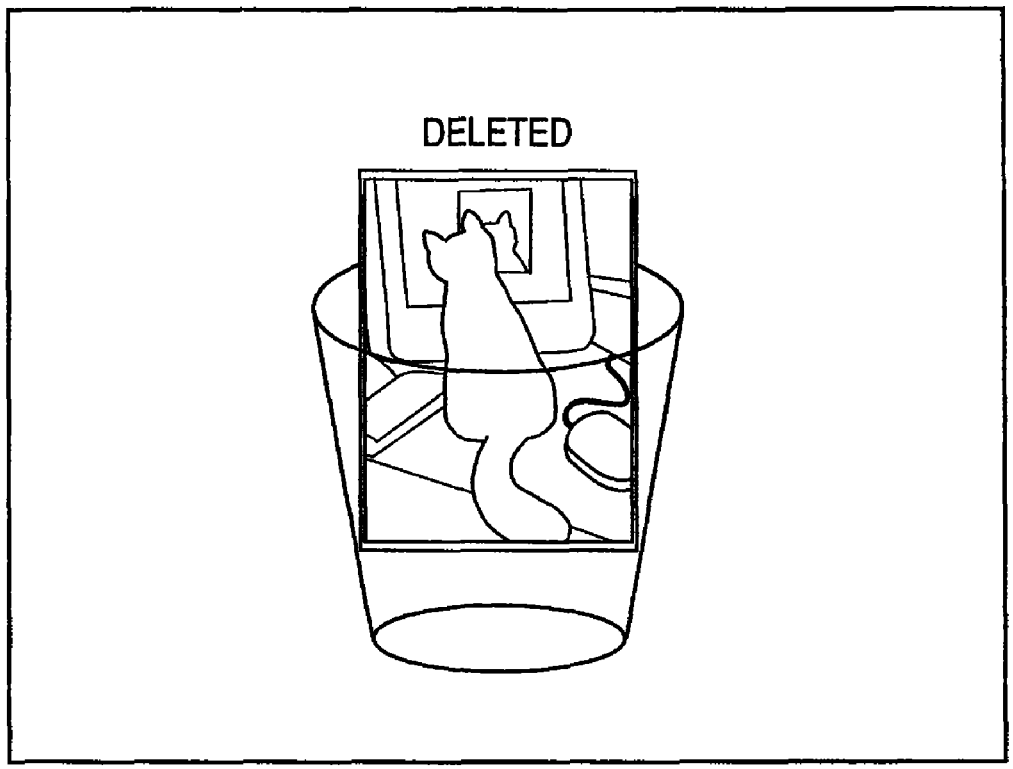

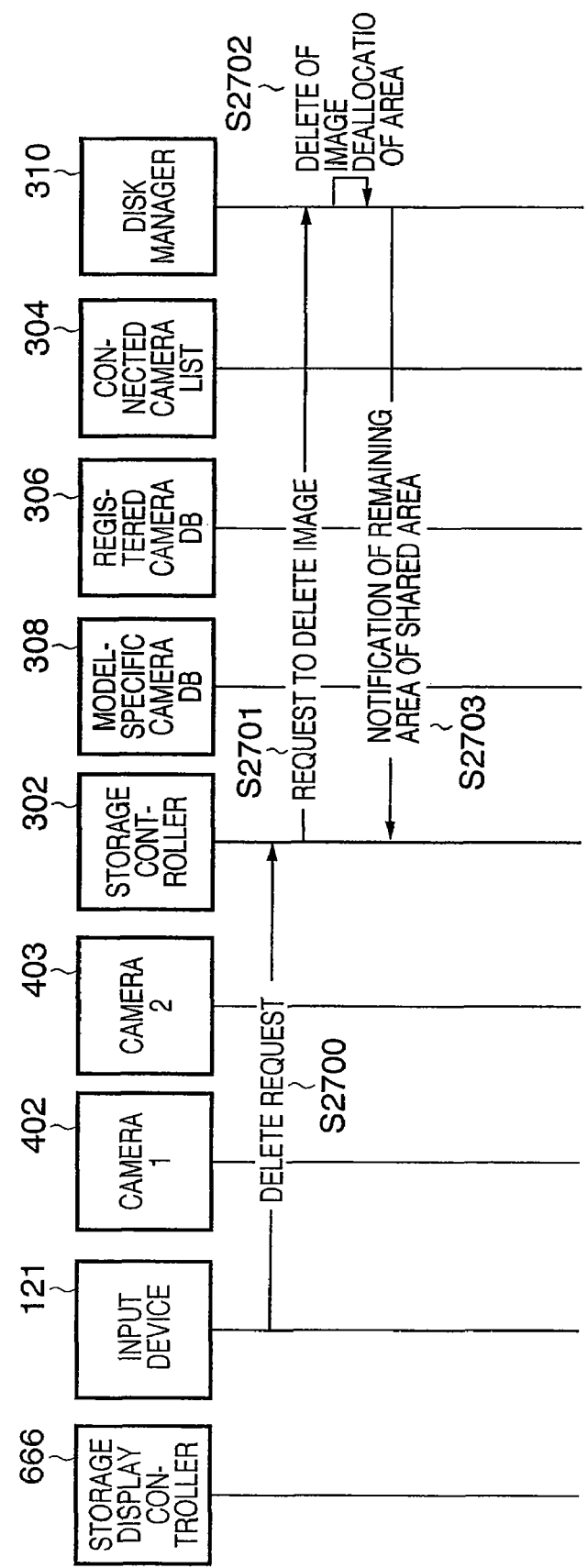

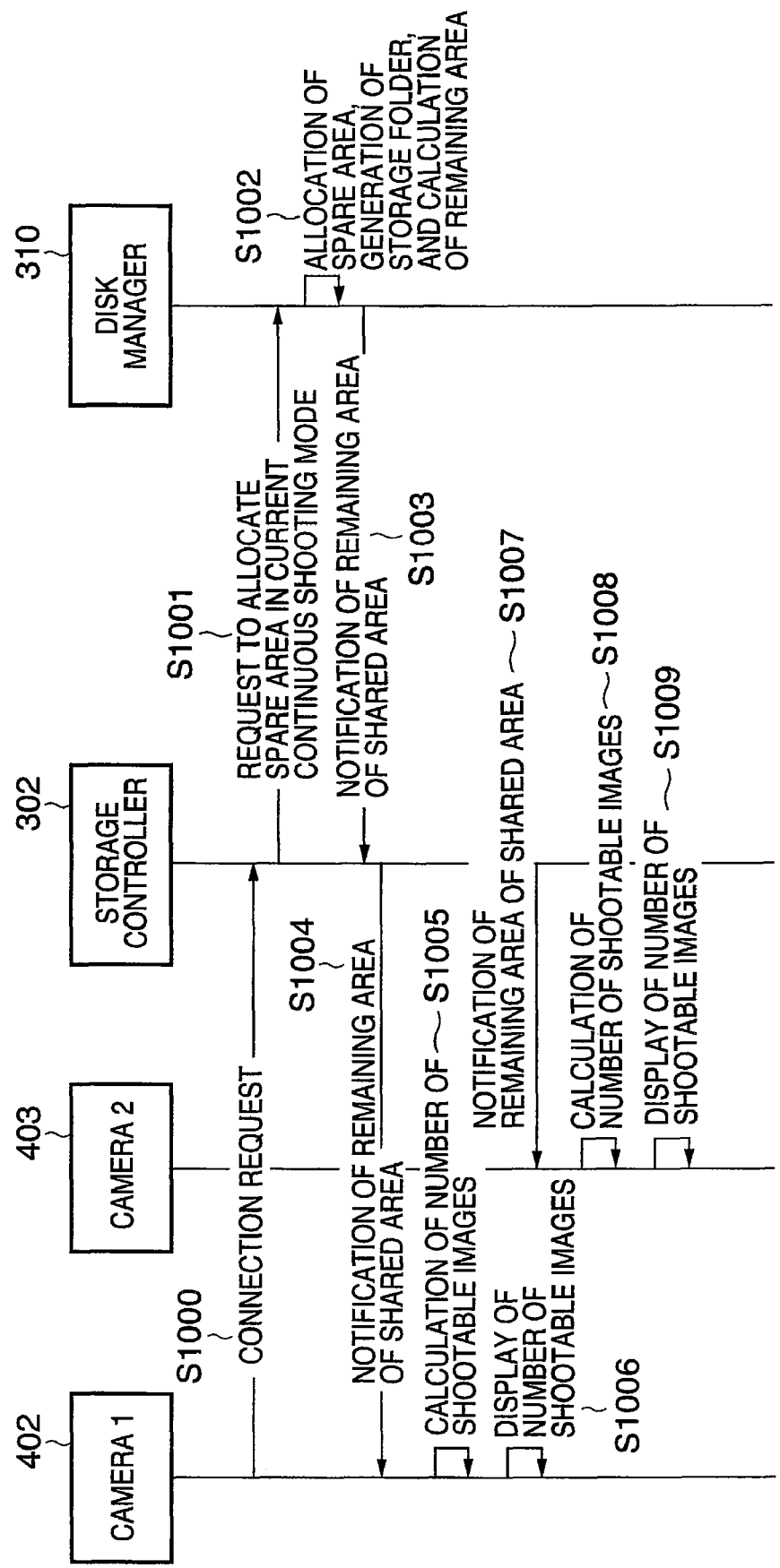

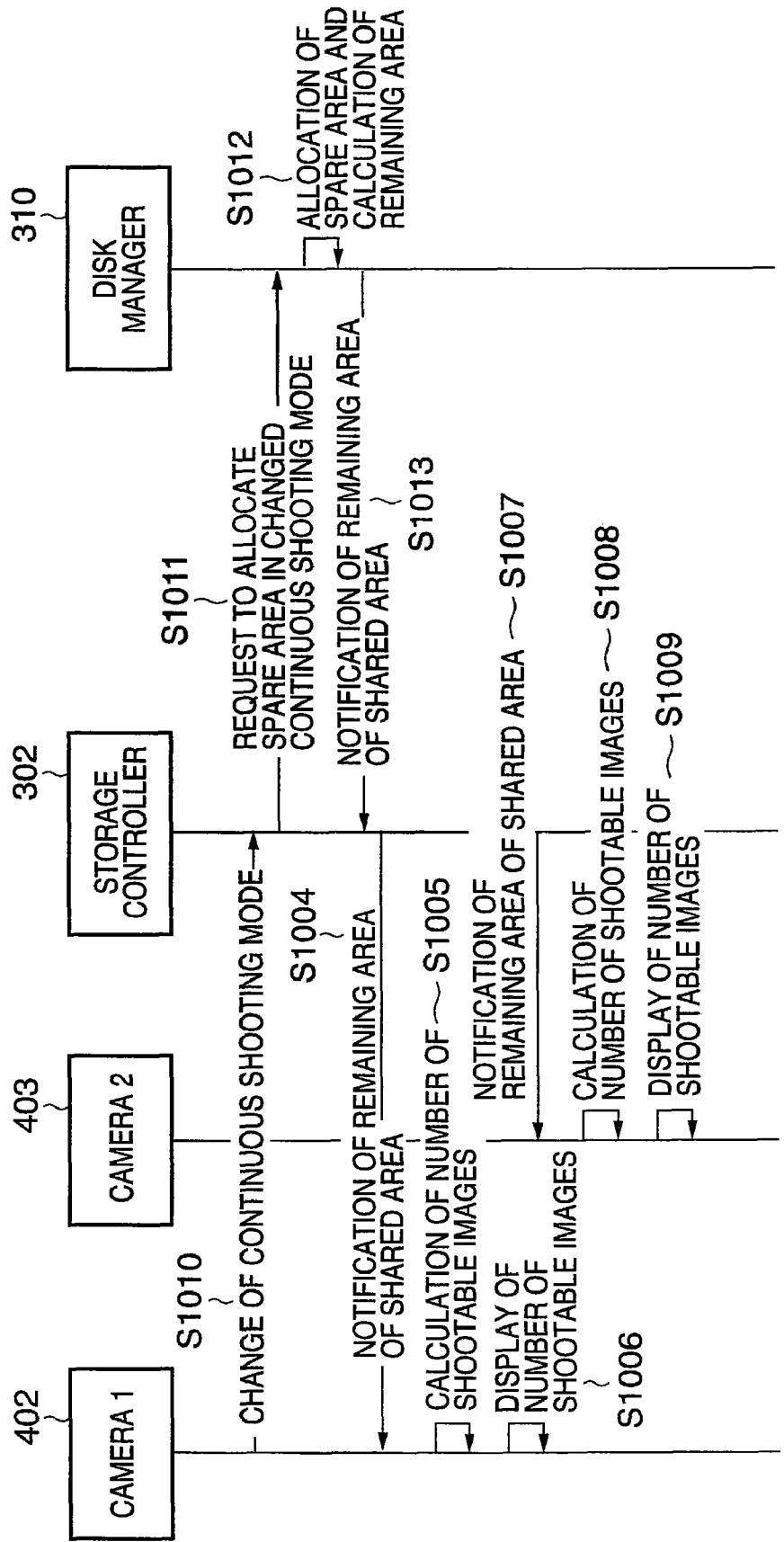

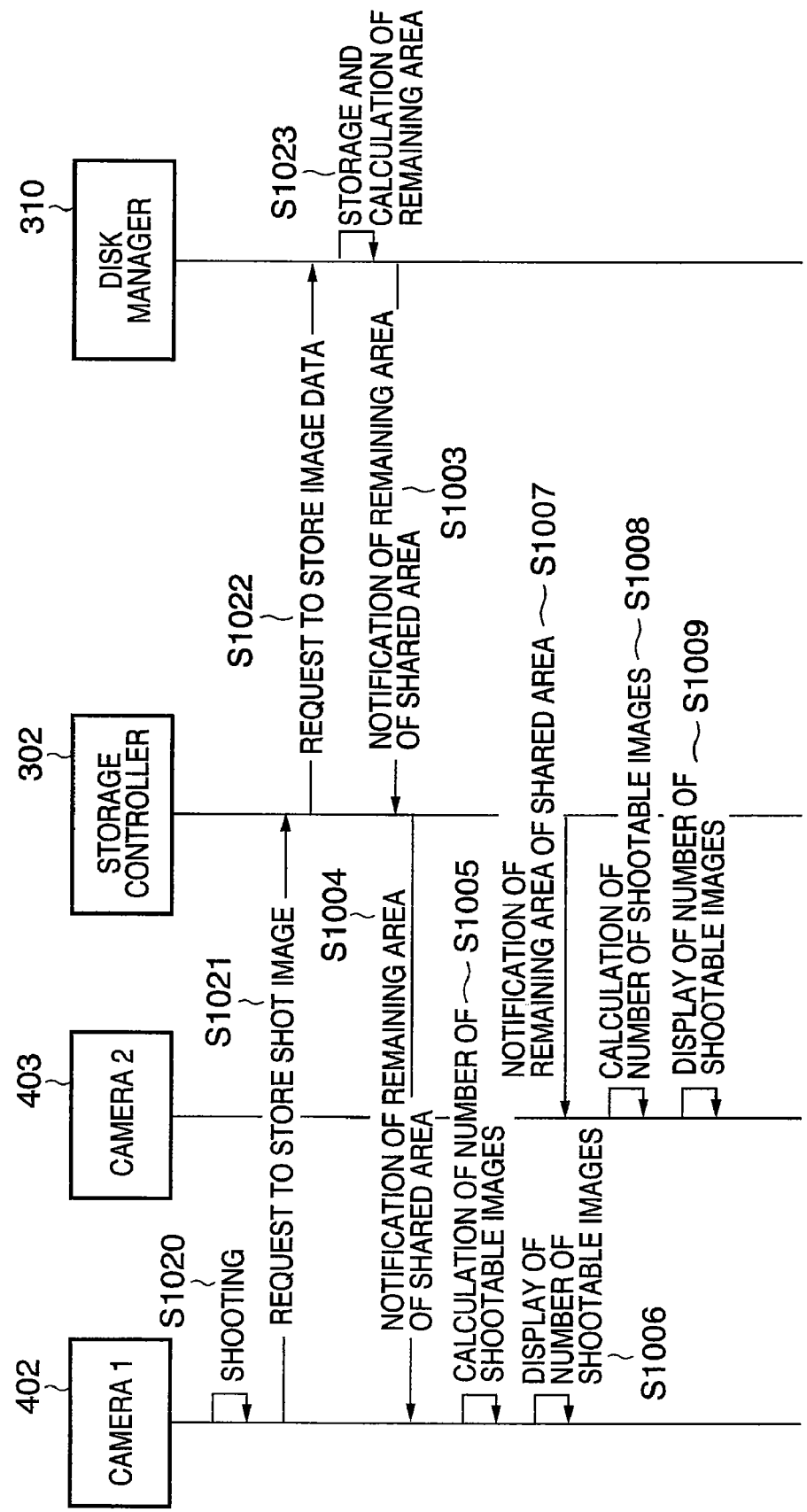

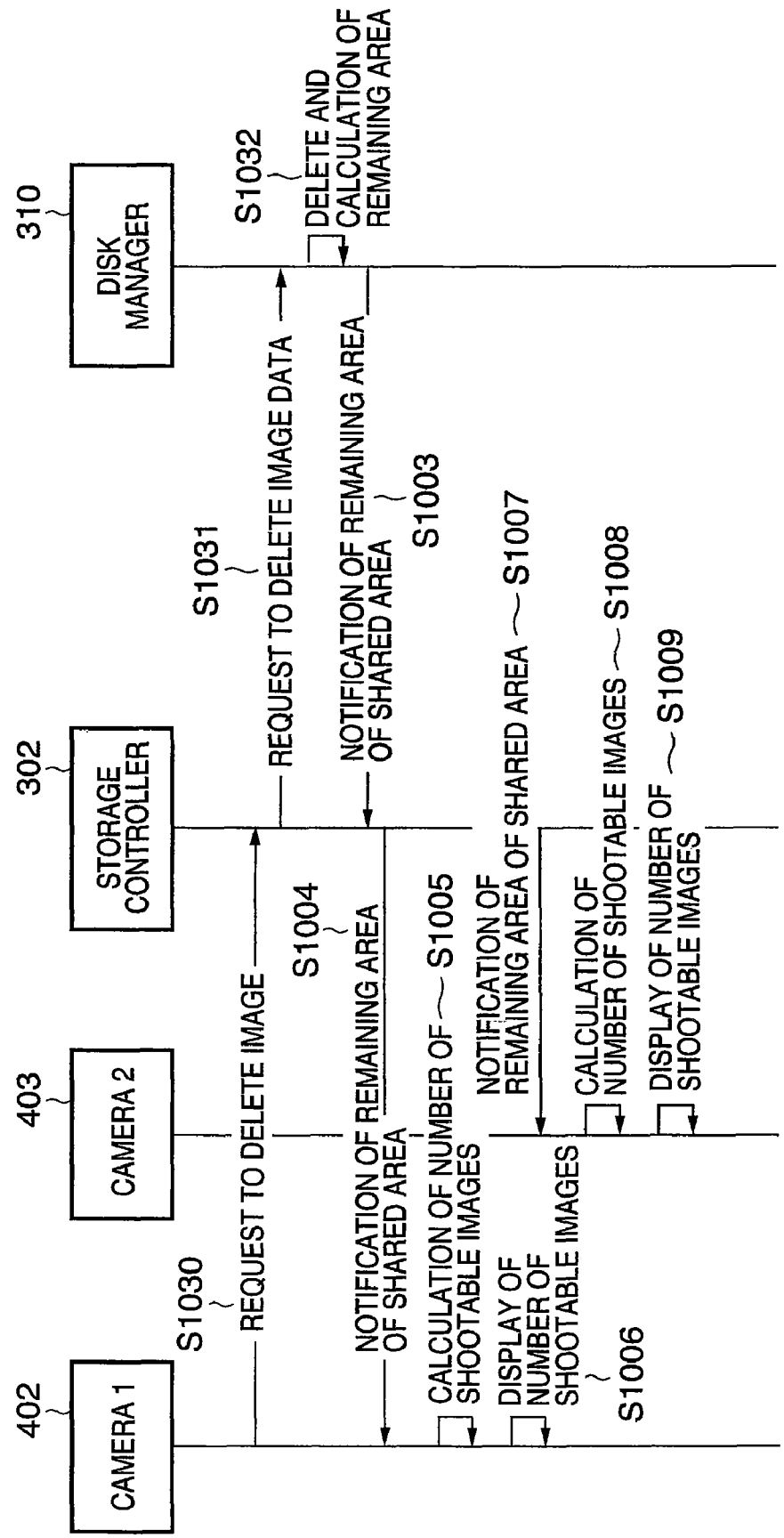

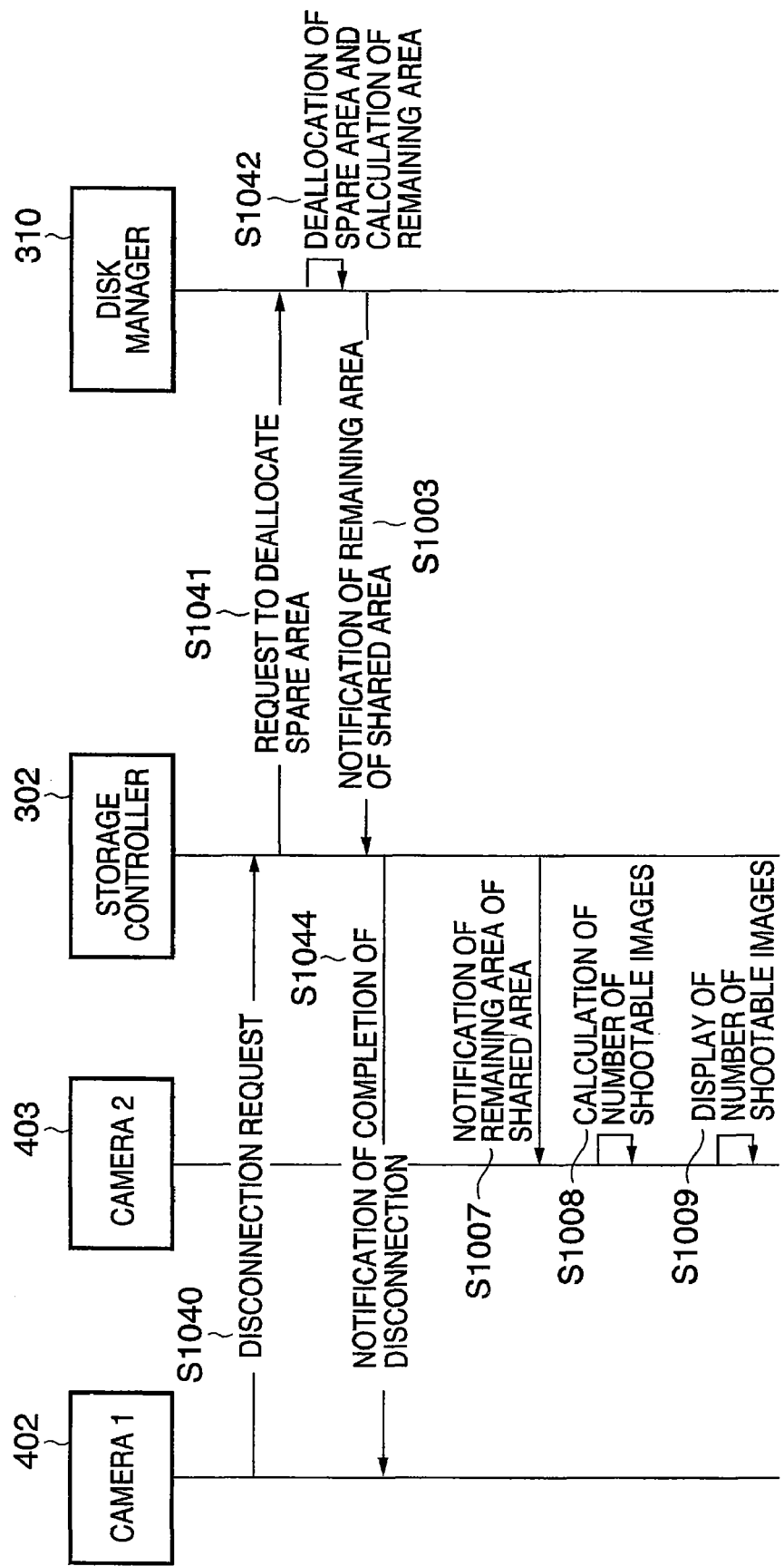

RECORDING APPARATUS FOR COMMUNICATING WITH A PLURALITY OF COMMUNICATION APPARATUSES, CONTROL METHOD THEREFOR, AND PROGRAM

BACKGROUND OF THE INVENTION

1. Field of the Invention

The present invention relates to a technique capable of recording data from a plurality of external apparatuses such as digital cameras on a recording medium.

2. Description of the Related Art

At present, removable media such as CF and SD cards are used to store image data captured by digital cameras. Removable media do not assume the use of a single removable medium for data read/write. A removable medium which becomes full of data must be inserted/removed into/from a dedicated slot in order to move data to another storage device such as a PC, bothering the user.

One memory card can exchange data with only one information device, and cannot exchange data with a plurality of information devices at the same time.

The memory card is thin and lightweight, and these physical restrictions limit the number of semiconductor memories mounted in the card. The limitation on the data save capacity of memory cards inhibits save of a large amount of data.

Since the memory card always uses a dedicated slot, it cannot be applied to a compact information device physically incapable of mounting a dedicated slot. External storage devices such as an external HDD, DVD, and CD-R/W have large data storage capacities, but are bulky, not easily portable, always require the AC power source, and are not suitable for mobile use.

In this situation, Japanese Patent Laid-Open No. 2003-78950 discloses a system capable of exchanging data between a portable remote storage and a plurality of devices such as a PDA, cell phone, and digital camera, and storing data in the portable remote storage.

However, when a plurality of digital cameras are connected to a portable remote storage, store shot images in the portable remote storage, and share one portable remote storage between them, the number of connected terminals changes dynamically. It is, therefore, convenient to share the data storage area.

According to this system, when a given digital camera shoots an image, the shared data storage area reduces and the number of shootable images of another connected digital camera decreases.

Thus, all connected digital cameras must periodically inquire, of the storage, the remaining area of the shared storage area or the number of shootable images. This puts a heavy burden on digital cameras and the portable remote storage.

If a plurality of digital cameras simultaneously request a shared portable remote storage to store image data, stored image data processed early consumes the shared data storage area. In response to this, the connected digital cameras are notified of the decrease in the number of shootable images. However, a digital camera for which the number of storable shot images becomes 0 has already completed shooting before the notification. In this case, a subsequent storage request results in an image data storage failure because of an insufficient storage area.

However, the conventional system does not consider the image data storage failure caused by the time lag between calculation and notification of the number of shootable images. This problem arises from sharing of the data storage area of a portable remote storage between a plurality of digital cameras.

SUMMARY OF THE INVENTION

It is an object of the present invention to reduce the load on a recording apparatus, efficiently design the overall system, and accurately calculate a data amount recordable on a recording means in accordance with setting change of each communication apparatus or the like.

It is another object of the present invention to obviate the need to periodically inquire the remaining area of a recording means, the number of recordable images, and the like by a plurality of communication apparatuses, and reduce the load on the communication apparatuses.

It is still another object of the present invention to avoid a data storage failure caused by the time lag of a shootable image count notification from a recording apparatus.

According to the first aspect of the present invention, there is provided a recording apparatus capable of communicating with a plurality of communication apparatuses, the apparatus comprising a communication unit capable of communicating with the plurality of communication apparatuses, a storage unit which stores data received by the communication unit, and a transmission unit which transmits information on a data amount storable in the storage unit to communication units of the plurality of communication apparatuses, wherein the information on the data amount storable in the storage unit that is transmitted to the communication apparatuses includes information based on a remaining area of a shared storage area commonly available for the plurality of communication apparatuses except for an exclusive storage area assigned to each communication apparatus.

According to the second aspect of the present invention, there is provided a method of controlling a recording apparatus capable of communicating with a plurality of communication apparatuses, the method comprising the steps of allowing communication with the plurality of communication apparatuses, and transmitting, to communication units of the plurality of communication apparatuses, information on a data amount storable in a storage unit which stores data received by the communication units, wherein the information on the data amount storable in the storage unit that is transmitted to the communication apparatuses includes information based on a remaining area of a shared storage area commonly available for the plurality of communication apparatuses except for an exclusive storage area assigned to each communication apparatus.

According to the third aspect of the present invention, there is provided a program which causes a computer to execute a method of controlling a recording apparatus capable of communicating with a plurality of communication apparatuses, the program causing the computer to execute the steps of allowing communication with the plurality of communication apparatuses, and transmitting, to communication units of the plurality of communication apparatuses, information on a data amount storable in a storage unit which stores data received by the communication units, wherein the information on the data amount storable in the storage unit that is transmitted to the communication apparatuses includes information based on a remaining area of a shared storage area commonly available for the plurality of communication apparatuses except for an exclusive storage area assigned to each communication apparatus.

According to the present invention, the recording apparatus transmits, to each communication apparatus, information based on the remaining area of a shared storage area commonly available by a plurality of communication apparatuses except for an exclusive storage area assigned to each communication apparatus. Each communication apparatus can calculate a data amount storable in the storage unit on the basis of the remaining area of the shared storage area. This can reduce the load on the recording apparatus, and achieve an efficient design of the overall system. Since each communication apparatus can calculate data storable in the storage unit, it can accurately calculate the amount of data storable in the storage unit in accordance with setting change of the communication apparatus or the like.

According to the present invention, at least either the number of shootable images or the image recording time in a target shooting mode is calculated. According to the present invention, a plurality of communication apparatuses need not periodically inquire the remaining area of the storage unit, the number of recordable images, and the like, decreasing the load on the communication apparatuses.

According to the present invention, a plurality of communication apparatuses are assigned exclusive storage areas. The present invention can, therefore, prevent a data storage failure caused by the time lag of, e.g., a shootable image count notification from the recording apparatus.

Further features of the present invention will become apparent from the following description of exemplary embodiments with reference to the attached drawings.

BRIEF DESCRIPTION OF THE DRAWINGS

FIG. 5 is a table showing a structure of a "default captured image data table";

FIG. 6 is a table showing a structure of a "learned captured image data size table" for each individual or model;

FIGS. 7A-7C are sequence charts showing an operation between the digital camera and the portable remote storage;

FIGS. 9A-9C are sequence charts showing an operation between the digital camera and the portable remote storage;

FIGS. 10A-10D are sequence charts showing an operation between the digital camera and the portable remote storage;

FIGS. 12A and 12B are sequence charts showing an operation between the digital camera and the portable remote storage;

FIG. 19 is a view showing a window example displayed on the display device of the digital camera;

FIG. 23 is a view showing a window example displayed on the display device of the digital camera;

FIG. 25 is a view showing a window example displayed on the display device of the digital camera;

FIG. 27 is a view showing a window example displayed on the display device of the portable remote storage or digital camera;

FIGS. 28A and 28B are sequence charts showing an operation between the digital camera and the portable remote storage;

FIG. 31 is a sequence chart showing an operation to connect the digital camera to the portable remote storage;

FIG. 32 is a sequence chart showing an operation to change the continuous shooting mode by the digital camera;

FIG. 33 is a sequence chart showing an operation to shoot and store an image by the digital camera;

FIG. 34 is a sequence chart showing an operation to delete captured image data from the digital camera; and FIG. 35 is a sequence chart showing an operation to disconnect the digital camera from the portable remote storage.

DESCRIPTION OF THE EMBODIMENTS

Preferred embodiments to which the present invention is applied will be described in detail below with reference to the accompanying drawings.

First Embodiment

The first embodiment of the present invention will be described. As the first embodiment of the present invention, a system in which a plurality of digital cameras are connected to a portable remote storage will be explained.

Figure 1:
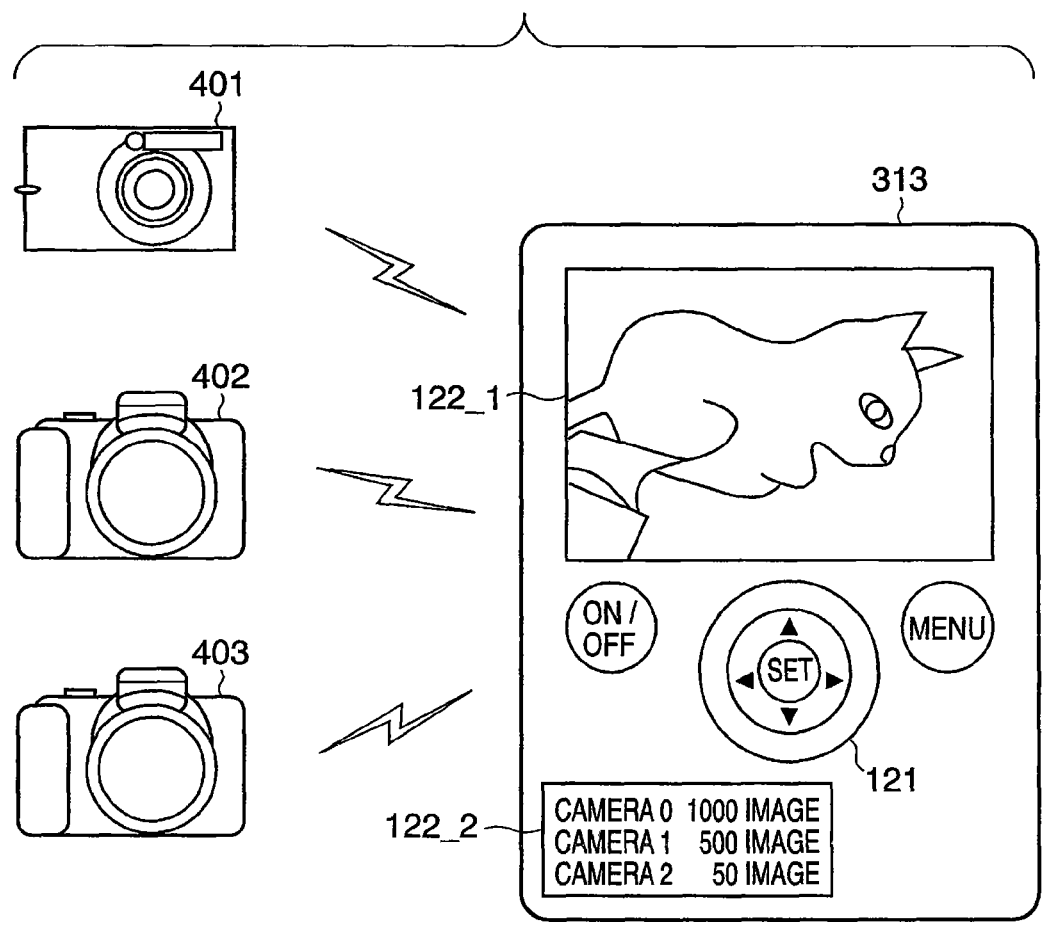
FIG. 1 is a view schematically showing a system configuration according to an embodiment of the present invention.

FIG. 1 is a view schematically showing a system configuration according to the first embodiment. In this system, as shown in FIG. 1, a plurality of digital cameras 401, 402, and 403 are connected to a portable remote storage 313 via a wireless LAN.

The digital cameras 401 to 403 transmit captured image data to the portable remote storage 313. The portable remote storage 313 stores image data received from the digital cameras 401 to 403 in an internal HDD 124 in FIG. 2.

The portable remote storage 313 calculates the numbers of shootable images of the connected digital cameras 401 to 403 from the remaining area of the HDD 124, and notifies the digital cameras 401 to 403 of them.

Figure 3:
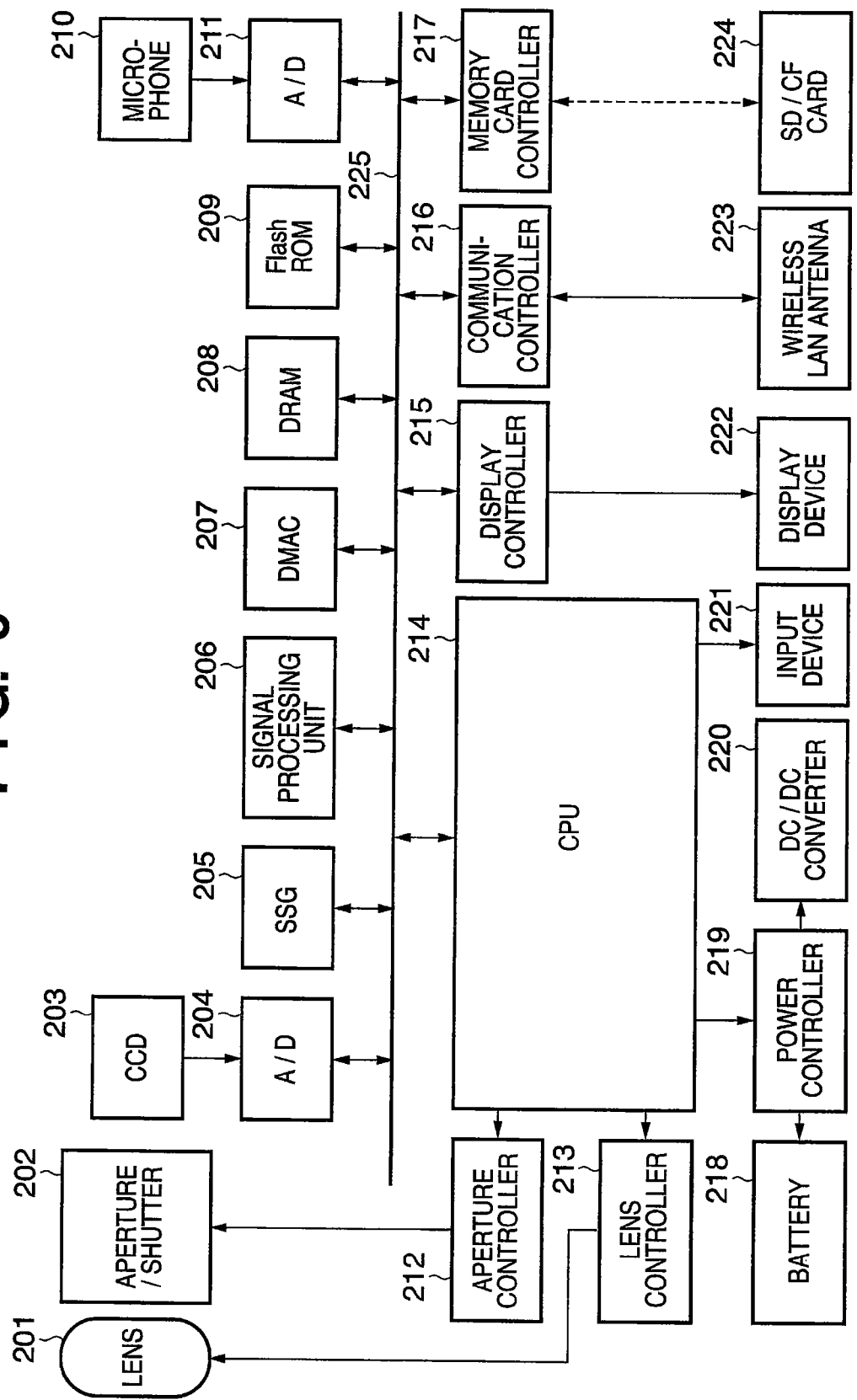
FIG. 3 is a block diagram showing the arrangement of a digital camera.

The digital cameras 401 to 403 update the numbers of shootable images to the notified ones, and display them on their display devices 222 in FIG. 3.

The portable remote storage 313 displays the updated numbers of shootable images on a display device 122_2. The stored image data can be viewed and deleted from the display devices of the portable remote storage 313 and digital cameras 401 to 403.

<Description of Arrangement of Portable Remote Storage 313>

Figure 2:
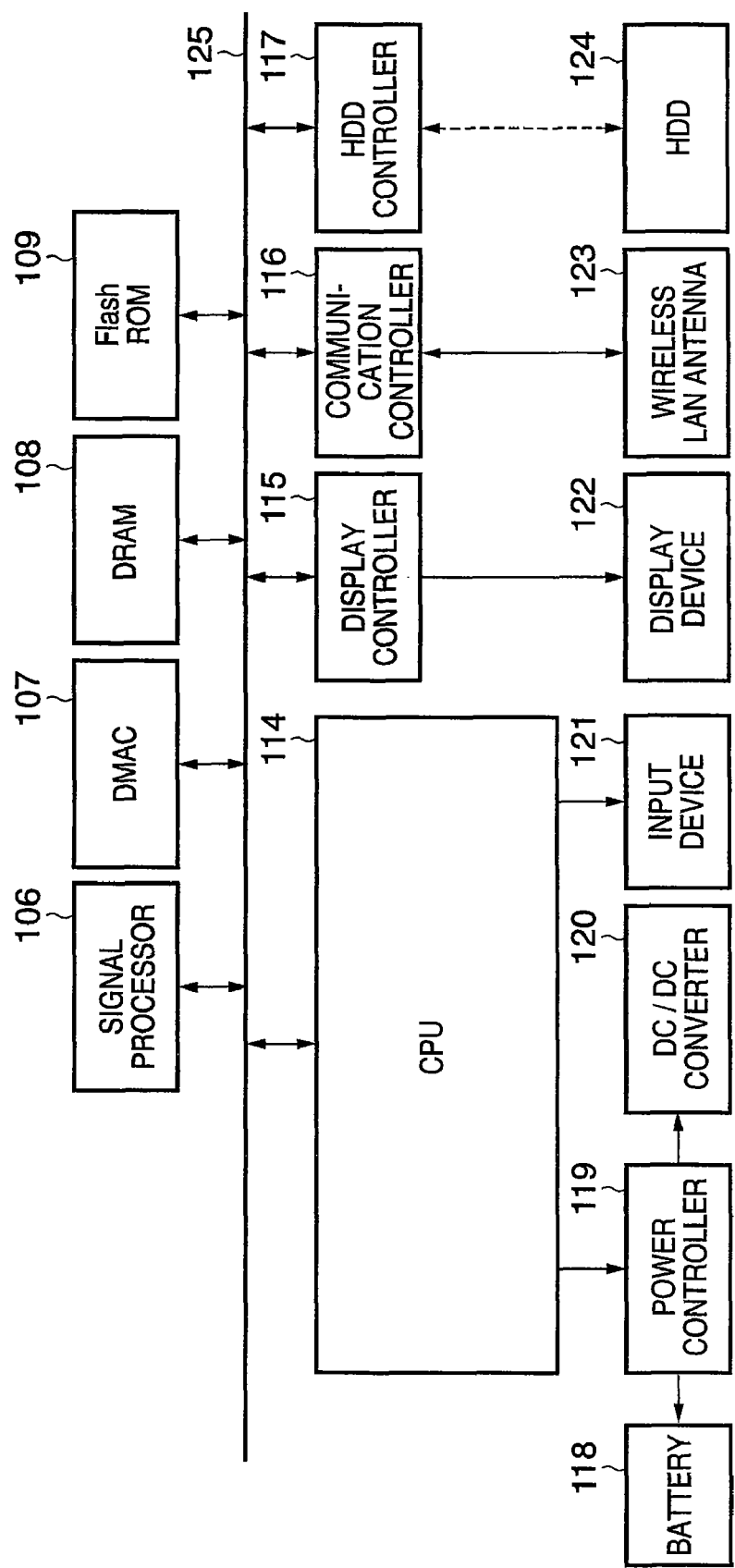
FIG. 2 is a block diagram showing the arrangement of a portable remote storage.

The arrangement of the portable remote storage 313 will be described with reference to FIG. 2. FIG. 2 is a block diagram showing the arrangement of the portable remote storage 313.

A signal processor 106 performs processes such as image processing, compression, and decompression at high speed. A DMA controller 107 transfers data between blocks at high speed via a system bus.

A DRAM 108 is the main storage unit of the portable remote storage 313. The DRAM 108 is also used as a buffer memory in shooting.

A flash ROM 109 stores firmware programs.

A CPU 114 executes a firmware program loaded from the flash ROM 109 using the DRAM 108 as a main memory, thereby achieving various kinds of control in the system.

A display controller 115 controls a display device 122 formed from a TFT liquid crystal display or the like. A communication controller 116 controls communication using a wireless LAN protocol. The display controller 115 is an application of a display control means according to the present invention.

A wireless LAN antenna 123 connects the portable remote storage 313 to one or more digital cameras 401 to 403 so as to communicate with each other. The wireless LAN antenna 123 is an application of a communication means according to the present invention.

An HDD controller 117 controls data read/write from/to the HDD 124. The HDD 124 is an application of a storage means according to the present invention.

A power controller 119 controls a DC/DC converter 120, and detects the remaining amount of a battery 118.

The DC/DC converter 120 converts power from the battery 118 into a proper voltage, and applies the voltage to the entire portable remote storage 313.

An input device 121 includes a keypad, lever, power switch, and the like for performing various operations on a menu window displayed on the display device 122.

A system bus 125 achieves high-speed data transfer between circuit blocks.

<Description of Arrangement of Digital Camera>

The arrangement of the digital cameras 401 to 403 will be explained with reference to FIG. 3. FIG. 3 is a block diagram showing the arrangement of the digital cameras 401 to 403.

Each of the digital cameras 401 to 403 comprises a lens unit 201, a shutter 202 having an aperture mechanism, and a CCD 203. The CCD 203 is an image sensor for outputting light having passed through the lens unit 201 as an electrical signal.

An A/D converter 204 converts an analog signal output from the CCD unit 203 into a digital signal.

An SSG unit 205 supplies sync signals to the CCD unit 203 and A/D converter 204.

A signal processing unit 206 performs processes such as image processing, compression, and decompression at high speed. A DMA controller 207 transfers data between blocks at high speed via a system bus.

A DRAM 208 is the main storage unit of each of the digital cameras 401 to 403. The DRAM 208 is also used as a buffer memory in shooting.

A flash ROM 209 stores firmware programs.

A microphone 210 converts sound outside the digital camera into an electrical signal. An A/D converter 211 converts an analog audio signal from the microphone 210 into a digital audio signal.

An aperture controller 212 controls the aperture/shutter 202. A lens controller 213 performs lens control such as AF lens driving and zoom lens driving for the lens unit 201.

A CPU 214 executes a firmware program loaded from the flash ROM 209 using the DRAM 208 as a main memory, thereby achieving various kinds of control in the camera system.

A display controller 215 controls the display device 222 formed from a TFT liquid crystal display or the like. A communication controller 216 controls communication using a wireless LAN protocol.

A wireless LAN antenna 223 connects one or more digital cameras to the portable remote storage 313.

A memory card controller 217 controls data read/write from/to an external storage medium 224 such as a CF card or SD card.

A power controller 219 controls a DC/DC converter 220, and detects the remaining amount of a battery 218.

The DC/DC converter 220 converts power from the battery 218 into a proper voltage, and applies the voltage to the whole digital camera.

An input device 221 includes a keypad, zoom lever, power switch, release switch, and the like for performing various operations on a menu window displayed on the display device 222. A system bus 225 achieves high-speed data transfer between circuit blocks.

<Outline of Functions of System>

In this system, the digital cameras 401 to 403 are simultaneously connected to the portable remote storage 313, and image data captured by the digital cameras are stored in the shared area (shared storage area) of the HDD 124 of the portable remote storage 313. The stored image data are displayed on a main display device 122_1 of the portable remote storage 313 for each of the digital cameras 401 to 403.

The sub-display device 122_2 of the portable remote storage 313 displays the numbers of shootable images of the digital cameras 401 to 403 connected to the portable remote storage 313.

The digital cameras 401 to 403 connected to the portable remote storage 313 display the numbers of shootable images on their display devices 222.

<Description of Function UI of System>

The above-described system provides the following seven functions to the user.

(1) Image data captured by the digital cameras 401 to 403 are stored in the portable remote storage 313.

(2) The display device 122 of the portable remote storage 313 displays saved image data.

(3) Saved image data is deleted from the portable remote storage 313.

(4) The display device 122 of the portable remote storage 313 displays information (e.g., model name, owner name, and the number of shootable images) on the digital cameras 401 to 403.

(5) The display devices 222 of the digital cameras 401 to 403 display saved image data.

(6) Saved image data are deleted from the digital cameras 401 to 403.

(7) The display devices 222 of the digital cameras 401 to 403 display information (e.g., model name, owner name, and the number of shootable images) on the digital cameras 401 to 403.

As for function (1), the portable remote storage 313 stores captured image data in a folder automatically upon shooting.

Functions (2) to (7) will be explained with reference to views showing user interfaces (UIs). Function (2) of displaying saved image data on the display device 122_1 of the portable remote storage 313 will be described first.

Figure 14:
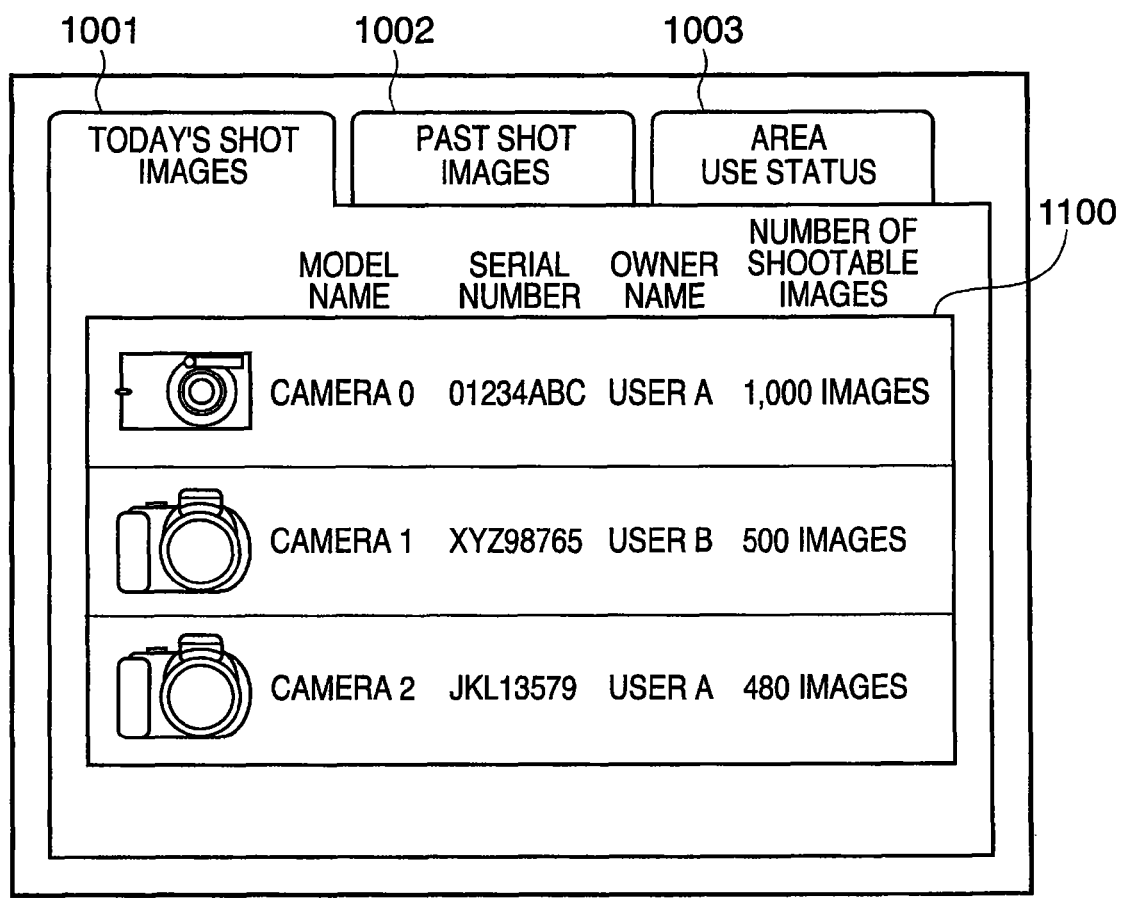
FIG. 14 is a view showing a window example displayed on the display device of the portable remote storage.

Saved image data are classified into image data captured by the currently connected digital cameras 401 to 403, and image data captured by the digital cameras 401 to 403 connected in the past. To display image data captured by the currently connected digital cameras, the user uses the cross key of the input device 121 of the portable remote storage 313 to select "today's shot images 1001" in a window displayed on the display device 122, as shown in FIG. 14. The user presses the SET button of the input device 121, and then a list 1100 (FIG. 14) of the connected digital cameras 401 to 403 is displayed.

Figure 15:
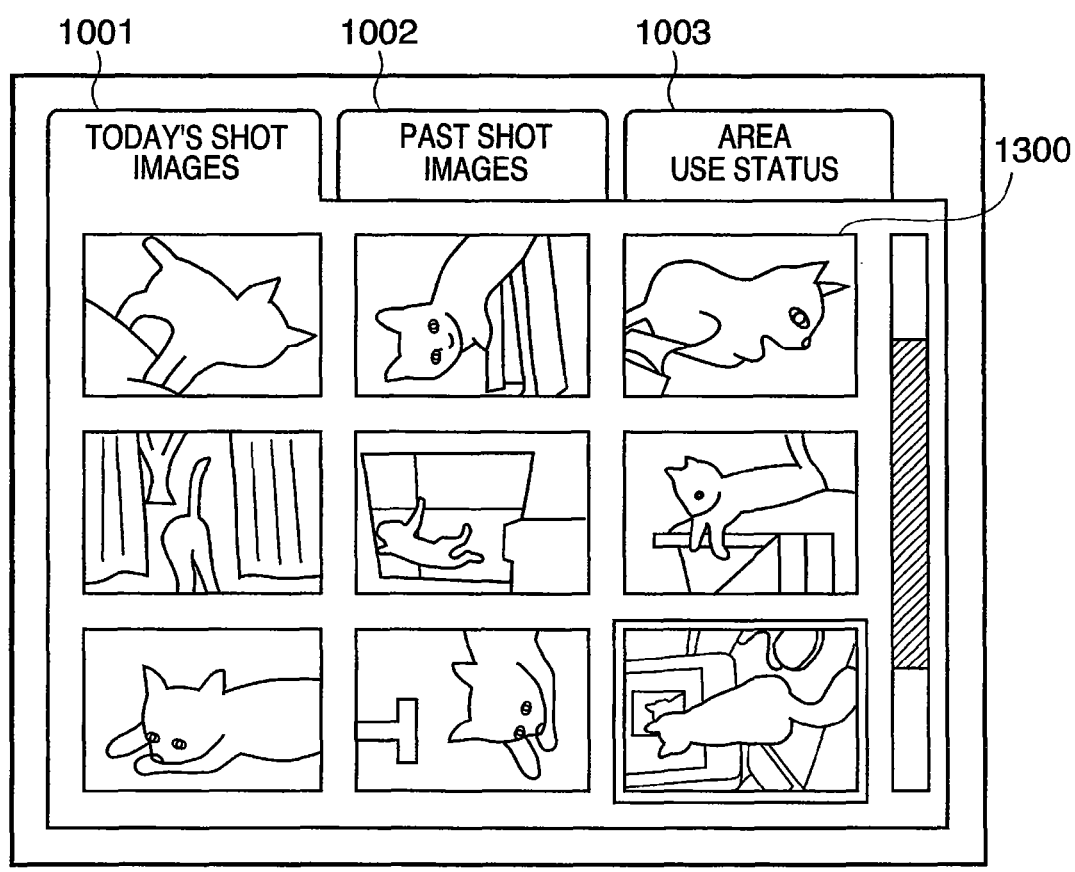
FIG. 15 is a view showing a window example displayed on the display device of the portable remote storage.
Figure 16:
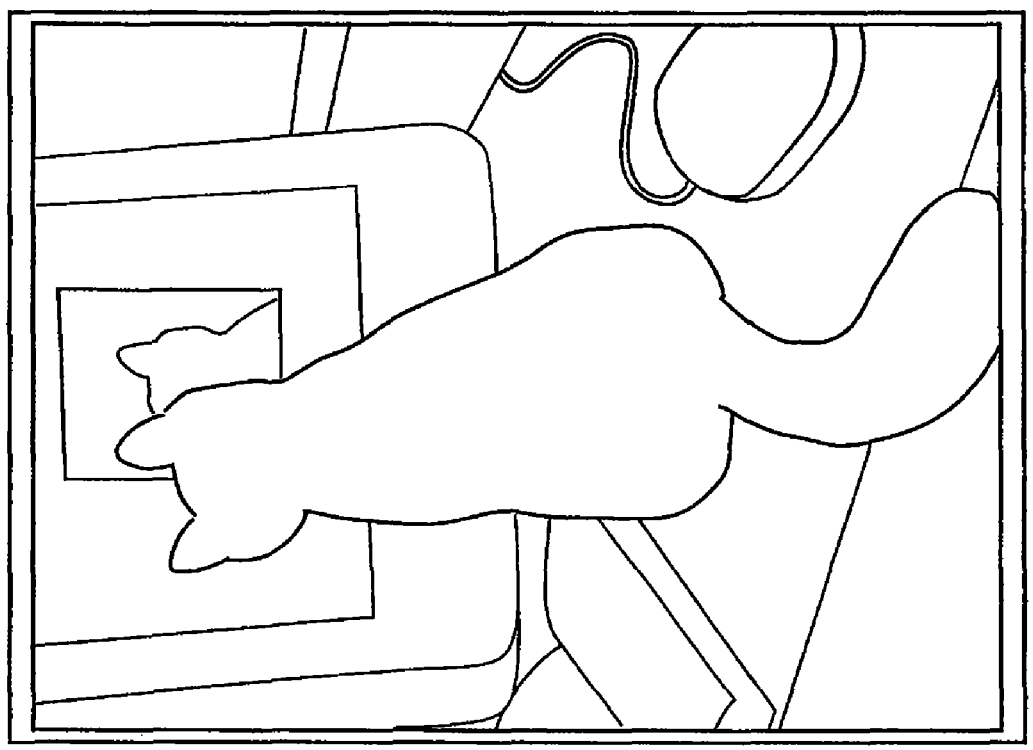
FIG. 16 is a view showing a window example displayed on the display device of the portable remote storage or digital camera.

Then, the user uses the cross key to select a digital camera from the displayed list of the connected digital cameras 401 to 403, and presses the SET button. In response to this, the thumbnails of image data captured by the selected digital camera are displayed as shown in FIG. 15. The user can select the thumbnail of image data to be displayed in the window shown in FIG. 15. The user presses the SET button while selecting the desired thumbnail, and then the actual image of the selected thumbnail is displayed as shown in FIG. 16.

Figure 17:
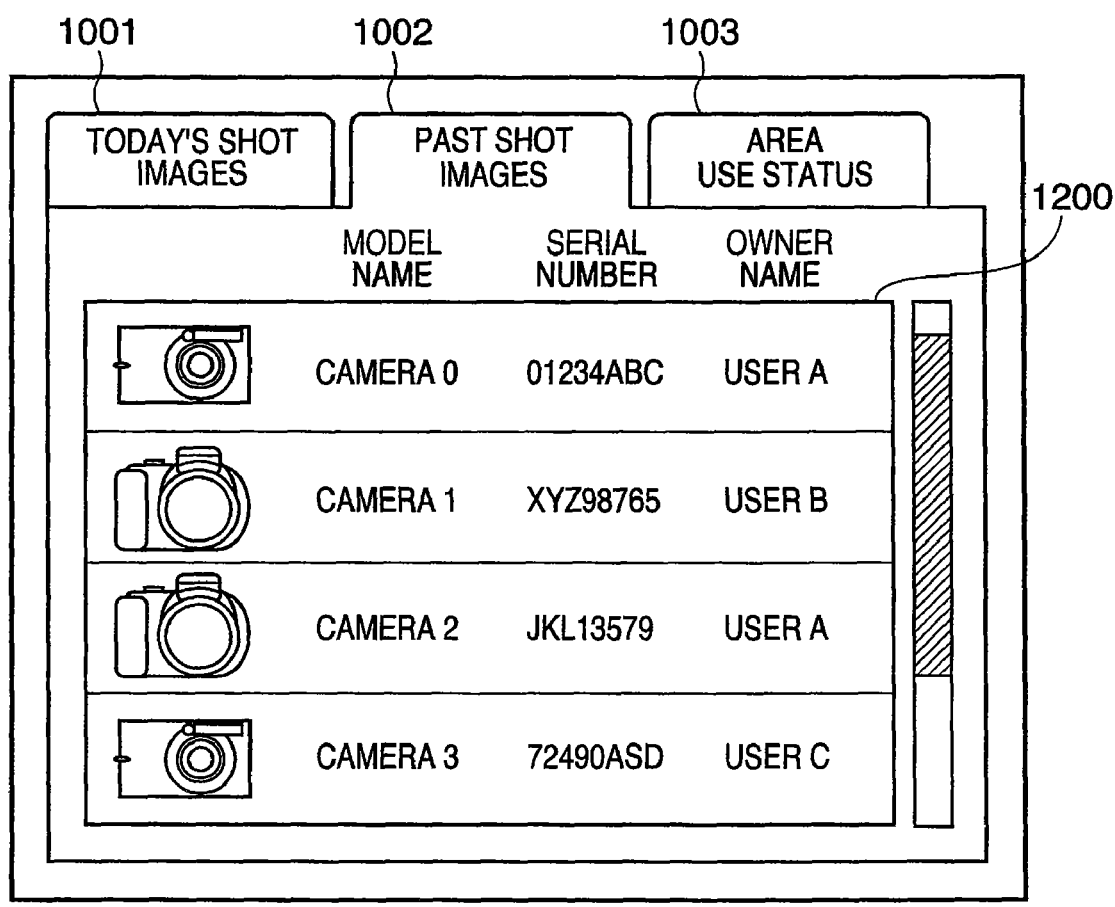
FIG. 17 is a view showing a window example displayed on the display device of the digital camera.

To display past captured image data, the user uses the cross key of the input device 121 to select "past shot images 1002" in the window displayed on the display device 122, as shown in FIG. 17, and presses the SET button of the input device 121. Then, a list 1200 (FIG. 17) of the digital cameras 401 to 403 having image data captured in the past is displayed.

Figure 18:
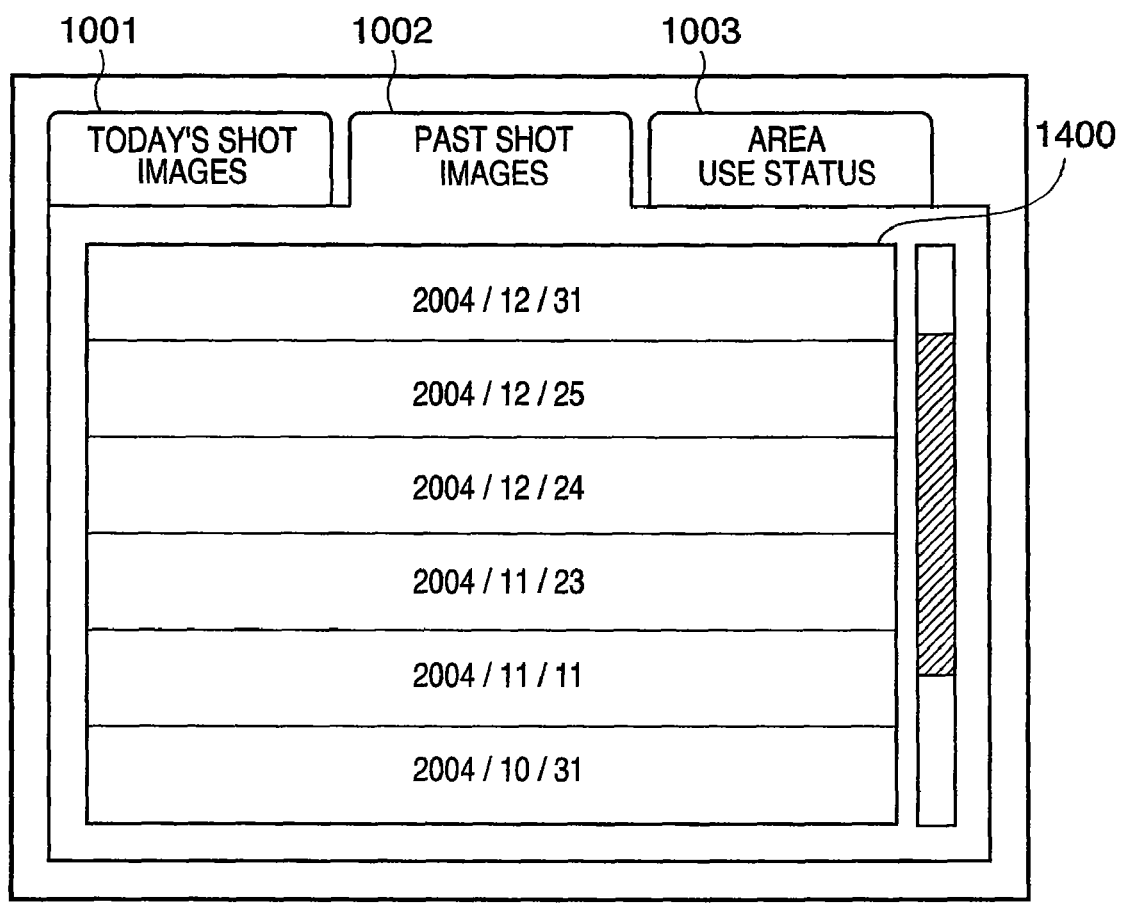
FIG. 18 is a view showing a window example displayed on the display device of the digital camera.

Then, the user uses the cross key to select a desired digital camera from the list 1200 (FIG. 17) of the digital cameras 401 to 403. After the digital camera is selected, a list 1400 of the folders of respective dates of the selected camera is displayed as shown in FIG. 18. The user selects a folder to be displayed from the list 1400.

After the user selects the desired folder, the thumbnails of image data in the selected folder are displayed as shown in FIG. 19. The user can select the thumbnail of image data to be displayed from these thumbnails. The user presses the SET button while selecting the desired thumbnail, and then the actual image of the selected thumbnail is displayed as shown in FIG. 16.

Function (3) of deleting saved image data from the portable remote storage 313 will be explained.

The user presses the delete button of the input device 121 while selecting a desired thumbnail from the thumbnail list shown in FIG. 15 or 19, selecting a desired folder from the folder list shown in FIG. 18, or displaying an actual image as shown in FIG. 16. Then, the selected image data is erased. Upon completion of erasing the image data, a window as shown in FIG. 27 is displayed to notify the user of the completion of erase.

Function (4) of displaying information on the digital cameras 401 to 403 on the display device 122_1 of the portable remote storage 313 will be explained.

Figure 20:
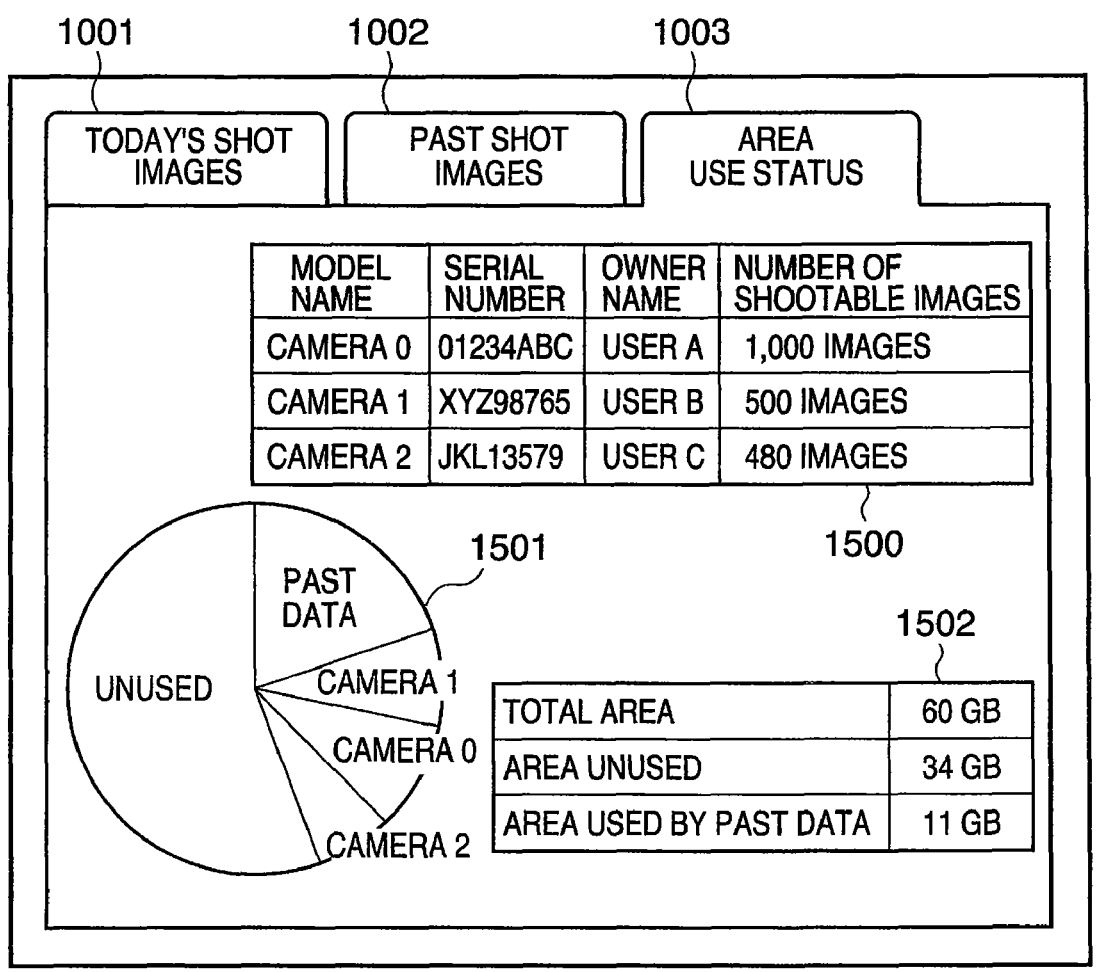
FIG. 20 is a view showing a window example displayed on the display device of the portable remote storage or digital camera.

To display the area use items of the portable remote storage 313 or the like, the user selects an "area use status 1003" with the cross key and presses the SET button, as shown in FIG. 20. Then, area use item tables 1501 and 1502 (FIG. 20) of the portable remote storage 313, and shootable image counts 1500 (FIG. 20) of the connected digital cameras 401 to 403 are displayed.

Function (5) of displaying saved image data on the display devices 222 of the digital cameras 401 to 403 will be explained.

Figure 21:
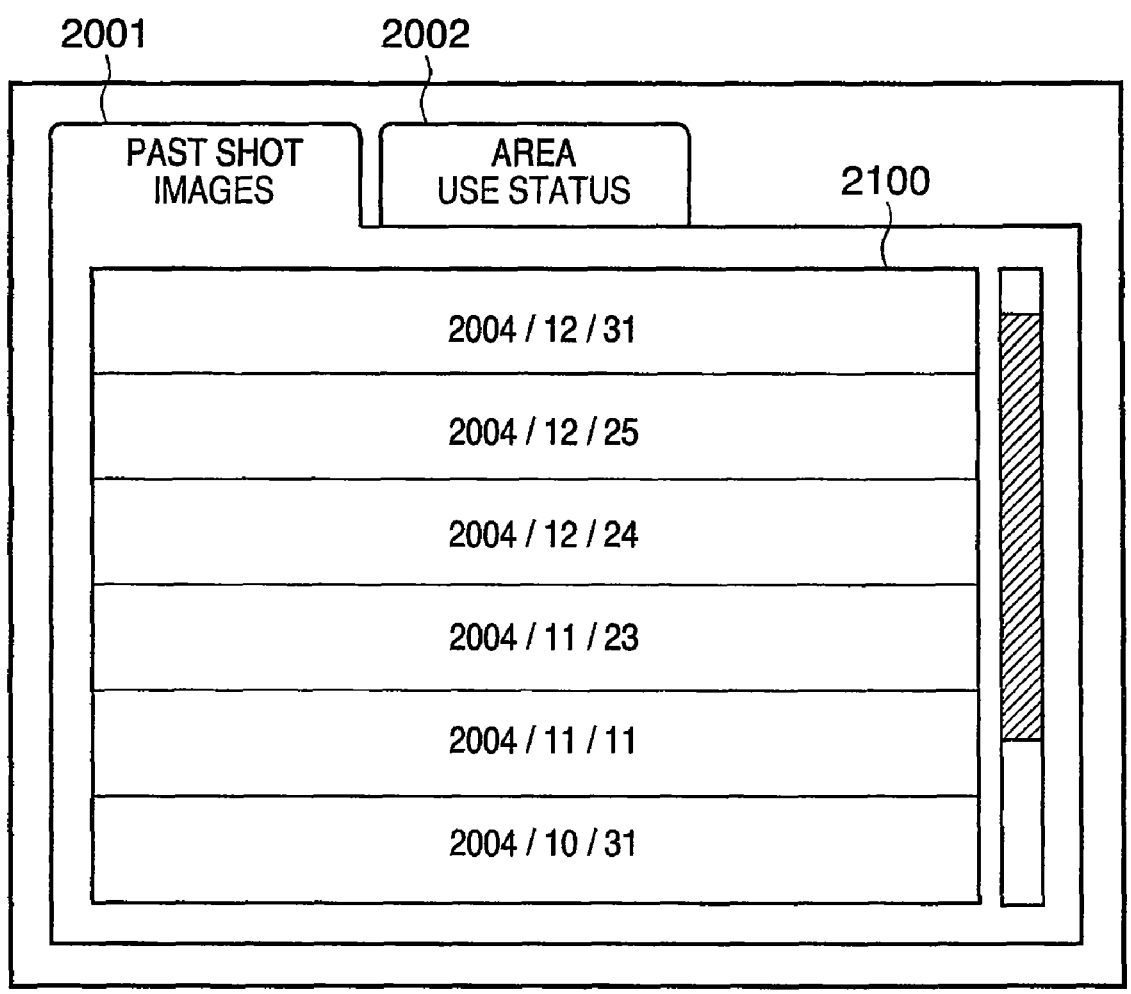
FIG. 21 is a view showing a window example displayed on the display device of the digital camera.

Saved image data are classified into currently captured image data and image data captured in the past. Currently captured image data are displayed in the same playback mode as that of a conventional digital camera. To display image data captured in the past, the user selects "past shot images 2001" with the cross key of the input device 221 of each of the digital cameras 401 to 403, as shown in FIG. 21.

Subsequently, the user operates the cross key to select a desired folder from a folder list 2100 which is displayed in the window of FIG. 21 and divided into dates, and presses the SET button of the input device 221. Then, thumbnails in the selected folder are displayed. The user selects a thumbnail whose actual image is to be displayed, and presses the SET button. In response to this, the actual image of the selected thumbnail is displayed.

Function (6) of deleting saved image data from the digital cameras 401 to 403 will be explained. If the user presses the delete button of the input device 221 of each of the digital cameras 401 to 403 while displaying the thumbnail list in FIG. 22 and selecting a thumbnail to be deleted, or displaying the actual image of a selected thumbnail, as shown in FIG. 16, and pressing the delete button of the input device 221 of each of the digital cameras 401 to 403, the selected image data is erased. Upon completion of erasing the image data, a window as shown in FIG. 27 is displayed to notify the user of the completion of erase.

Function (7) of displaying information on the digital cameras on the display devices 222 of the digital cameras 401 to 403 will be explained.

To display the area use items of the portable remote storage 313, the user selects an "area use status 2002" with the cross key and presses the SET button, as shown in FIG. 23. Then, the area use items of the portable remote storage 313, and the numbers of shootable images of the connected digital cameras 401 to 403 are displayed.

In the above description, the portable remote storage 313 uses the wireless LAN as a communication means when it uses the HDD as a storage medium. However, the present invention is not limited to this.

<Description of Module Configuration of Portable Remote Storage>

Figure 4:
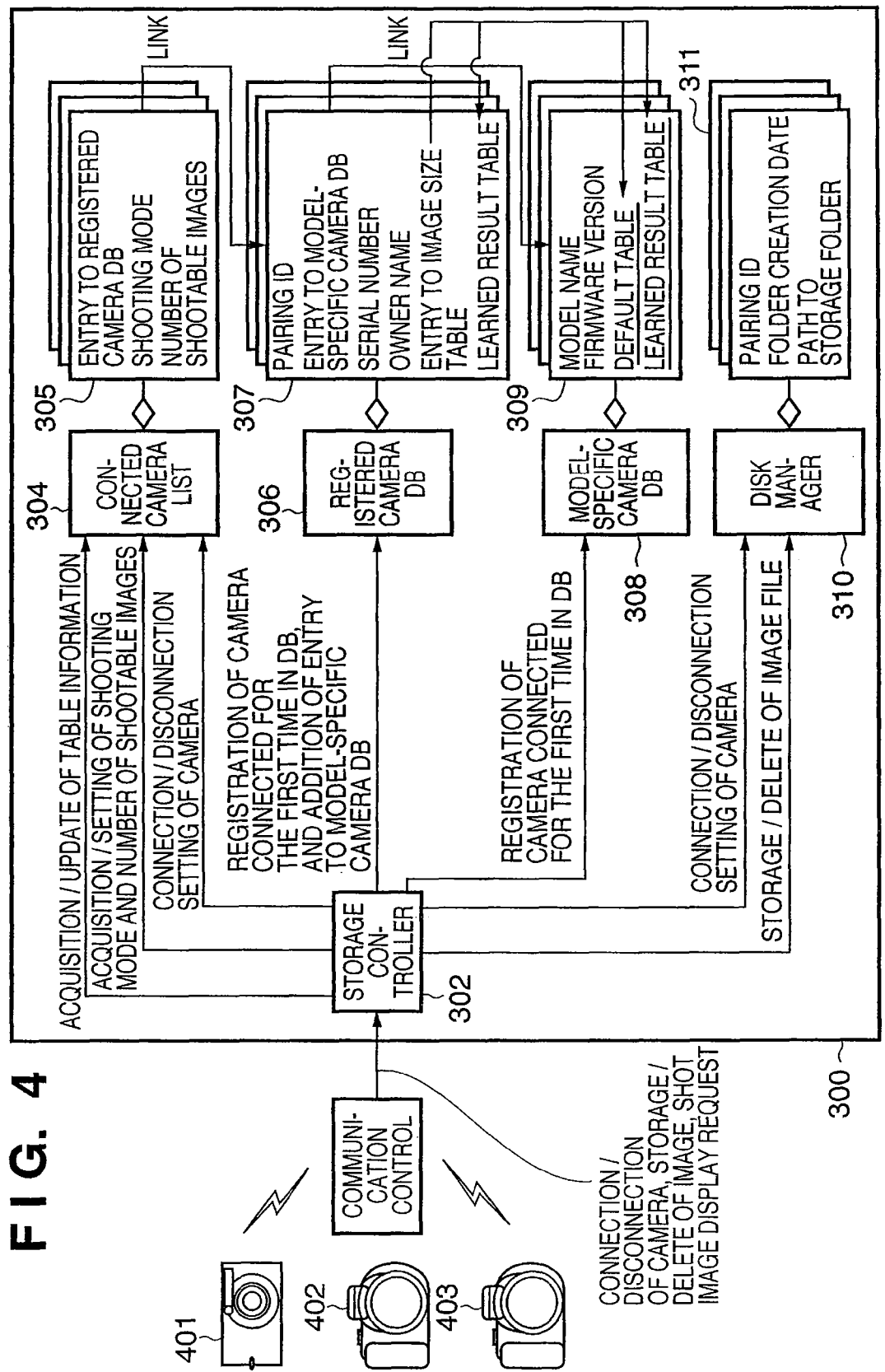
FIG. 4 is a view showing some of software modules running inside the portable remote storage.

The module configuration of the portable remote storage 313 will be described. FIG. 4 is a view showing some of software modules running inside the portable remote storage 313.

A storage controller domain 300 runs inside the portable remote storage 313. Each module in the storage controller domain 300 will be explained with reference to FIG. 4.

A storage controller 302 controls other modules in the portable remote storage 313. Main processes are registration and update of the standard captured image data size table used to calculate the number of shootable images, calculation of the number of shootable images, and generation of a pairing ID.

Pairing IDs are generated by the storage controller 302 when the digital cameras 401 to 403 are connected to the portable remote storage 313 for the first time, and used later to specify the respective digital cameras.

The portable remote storage 313 incorporates three databases: a model-specific camera DB 308, registered camera DB 306, and connected camera list 304.

The model-specific camera DB 308 is a database having information on each model. The model is determined by the firmware version of the model.

Model-specific camera information 309 held in the model-specific camera DB 308 contains, for each model, the model name, firmware version, "default captured image data size table" for each model, and "learned captured image data size table" for each model.

The registered camera DB 306 registers information on an individual digital camera when the digital cameras 401 to 403 are connected for the first time. The registered camera DB 306 is linked to model information corresponding to a connected digital camera when the digital cameras 401 to 403 are connected to the portable remote storage 313 for the first time.

The registered camera DB 306 is a set of registered camera DB entries 307. Information held by each entry 307 of the registered camera DB 306 contains the pairing ID, serial number, owner name, an entry to a model-specific camera DB corresponding to a registered digital camera, and an entry to a captured image data size table for calculating the number of shootable images. The entry 307 of the registered camera DB 306 also holds a "learned captured image data size table" for each individual.

The connected camera list 304 is a list of the digital cameras 401 to 403 currently connected to the portable remote storage 313. When the digital cameras 401 to 403 are connected to the portable remote storage 313, information on the digital cameras 410 to 403 connected to the storage controller 302 is held as the connected camera list.

Connected camera information 305 held in the connected camera list 304 contains entries to the registered camera DB 306 that correspond to the connected digital cameras 401 to 403, the current shooting modes of the connected digital cameras 401 to 403, and the current numbers of shootable images.

A disk manager 310 manages an HDD which stores image data. When the digital cameras 401 to 403 are connected, the disk manager 310 assigns areas equal in size to the buffer sizes of the connected digital cameras 401 to 403 from an area shared between the digital cameras 401 to 403 connected to the portable remote storage 313 to store captured image data. The assigned area will be called a spare area. The spare areas are exclusive storage areas the digital cameras 401 to 403 can use singly.

Assigning spare areas to the respective digital cameras 401 to 403 can avoid the problem that the digital cameras 401 to 403 are notified after shooting that the number of shootable images is 0 and cannot store shot images owing to the time lag of the shootable image count notification between the portable remote storage 313 and the digital cameras 401 to 403.

If the storage area runs short after the notification, image data are stored in the spare area allocated in advance. This can solve a problem arising from shortage of the shared area owing to the time lag of the shootable image count notification.

The disk manager 310 stores or deletes captured image data using the pairing ID as a key. Disk management information 311 managed by the disk manager 310 contains the pairing ID used to store/delete image data by the disk manager 310, the creation date of a storage folder, and the path to the storage folder.

<Description of Sequence between Modules in System>

Operations to connect/disconnect the digital cameras 401 to 403 to/from the portable remote storage 313, store/delete captured image data, and change the shooting mode will be described in detail with reference to sequence charts. These processes are implemented by software programs running on the CPU 114. Programs to be executed are stored in the flash ROM 109 of the portable remote storage 313 and expanded in the DRAM 108.

Figure 7A:
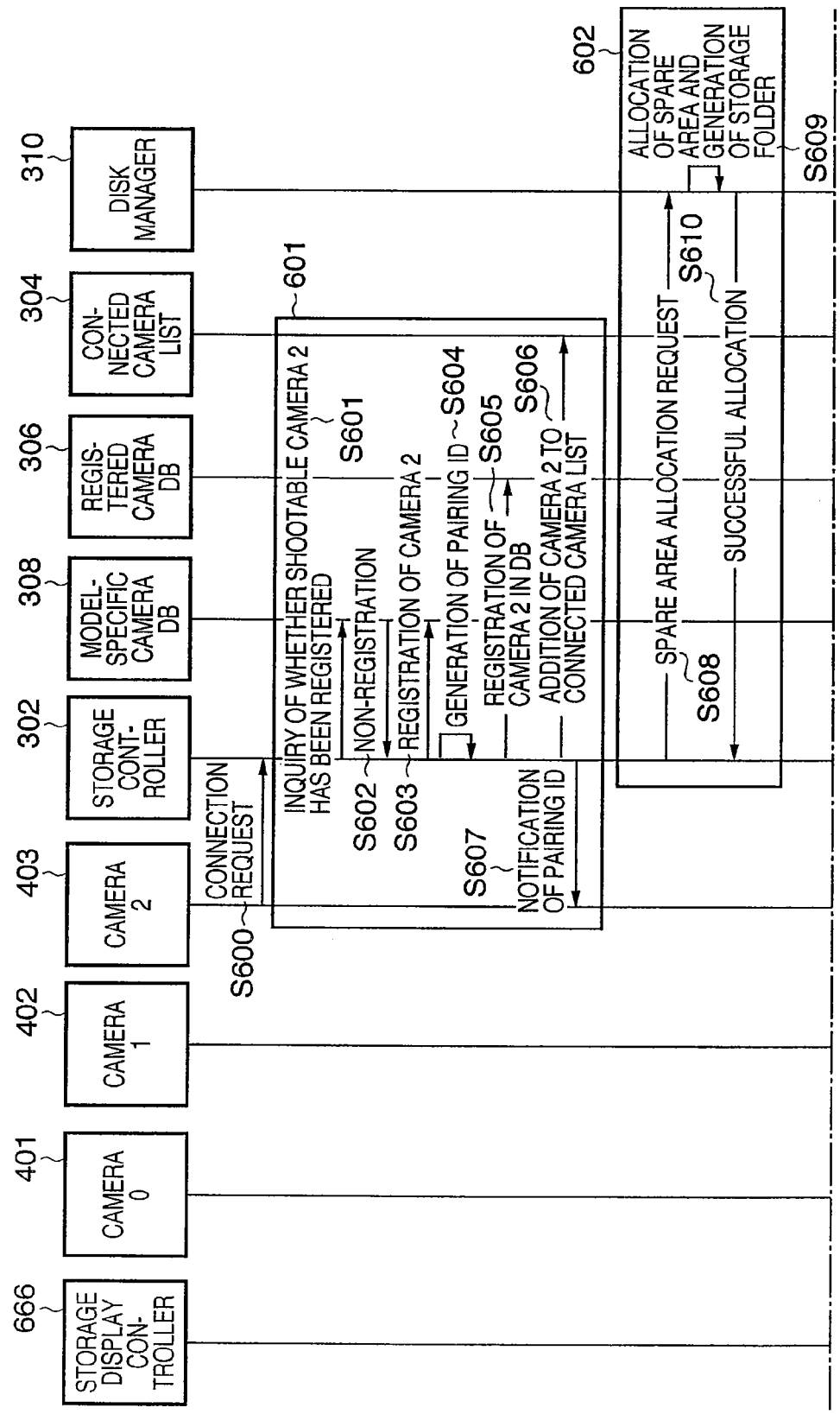
Figure 7B:
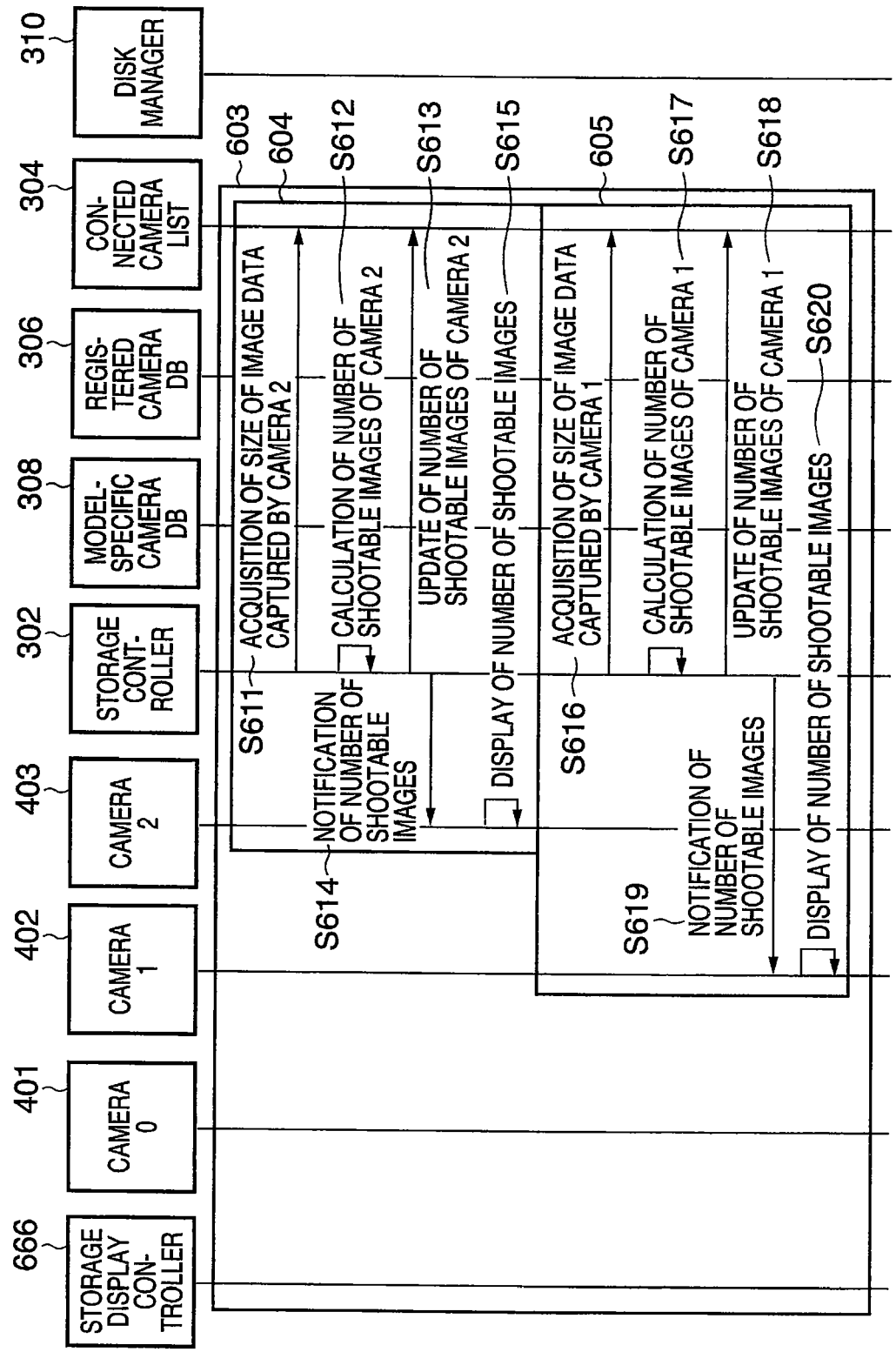

A sequence when digital camera 2 is connected to the portable remote storage 313 under the following conditions will be explained with reference to FIGS. 7A-7C. The conditions of this sequence are as follows:

The portable remote storage 313 does not have the connection log of digital camera 2, and digital camera 2 is registered in neither the model-specific camera DB 308 nor registered camera DB 306.

An area unused in the shared area remains in the portable remote storage 313 by a spare area or more for digital camera 2.

There are roughly three processing sequences: digital camera 2 information registration processing 601, storage area setting processing 602, and shootable image count finalization processing 603.

The digital camera 2 information registration processing 601 will be described. First, digital camera 2 requests the storage controller 302 to connect digital camera 2 (S600). Since no pairing ID corresponding to digital camera 2 exists, the storage controller 302 determines that digital camera 2 is to be connected for the first time, and inquires of the model-specific camera DB 308 whether information corresponding to the model of digital camera 2 has been registered (S601). In this case, information corresponding to the model of digital camera 2 has not been registered in the model-specific camera DB 308 (S602). Hence, the model name of digital camera 2, firmware version, "default captured image data size table" for each model, and "learned captured image data size table" are registered (S603).

The storage controller 302 generates a pairing ID used to specify digital camera 2 when connecting digital camera 2 afterward (S604).

The storage controller 302 sets, in the registered camera DB 306, the generated pairing ID, serial number, owner name, and "learned captured image data size table" for each individual. The storage controller 302 links an entry to the model-specific camera DB 308 that corresponds to digital camera 2.

The storage controller 302 sets, at a pointer to the captured image data size table, one of the "default captured image data size table" for each model and the "learned captured image data size tables" for each model and individual in accordance with the level of learning. As a result, registration of the model-specific camera information 309 corresponding to digital camera 2 in the registered camera DB 306 is complete (S605).

Next, the storage controller 302 sets the current shooting mode in the connected camera list 304, and links an entry to the registered camera DB 306 that corresponds to digital camera 2 (S606). Then, the storage controller 302 notifies digital camera 2 of the pairing ID (S607).

The storage area setting processing 602 will be described. The storage controller 302 requests the disk manager 310 to allocate a spare area in the shared area and create a storage folder (S608). After the spare area is allocated in the shared area (S609), the disk manager 310 notifies the storage controller 302 of successful allocation of the spare area together with the remaining area of the shared area (S610).

The shootable image count finalization processing 603 will be described. The storage controller 302 executes a series of processes 604, 605, and 606 for digital cameras 0, 1, and 2 registered in the connected camera list 304. The series of processes is the "shootable image count finalization processing" 603. The shootable image count finalization processing 603 is a processing example of a calculation means according to the present invention.

The storage controller 302 tracks a link from an entry in the connected camera list 304 to the registered camera DB 306, and acquires a captured image data size in the current shooting mode (S611, S616, and S621).

The storage controller 302 calculates the number of shootable images by dividing the remaining area of the shared area notified in S609 by the captured image data size in the current shooting mode (S612, S617, and S622).

The storage controller 302 updates the number of shootable images in the connected camera list 304 to the calculated one (S613, S618, and S623).

The storage controller 302 notifies connected digital cameras 0, 1, and 2 of the calculated number of shootable images (S614, S619, and S624).

Digital cameras 0, 1, and 2 display the notified number of shootable images on their display devices 222 (S615, S620, and S625).

The storage controller 302 requests a storage display controller 666 to display the number of shootable images (S626). The storage display controller 666 displays the number of shootable images on the display device 122_2 (S627). Upon receiving the shootable image count notification, digital camera 2 can shoot an image.

Figure 8:
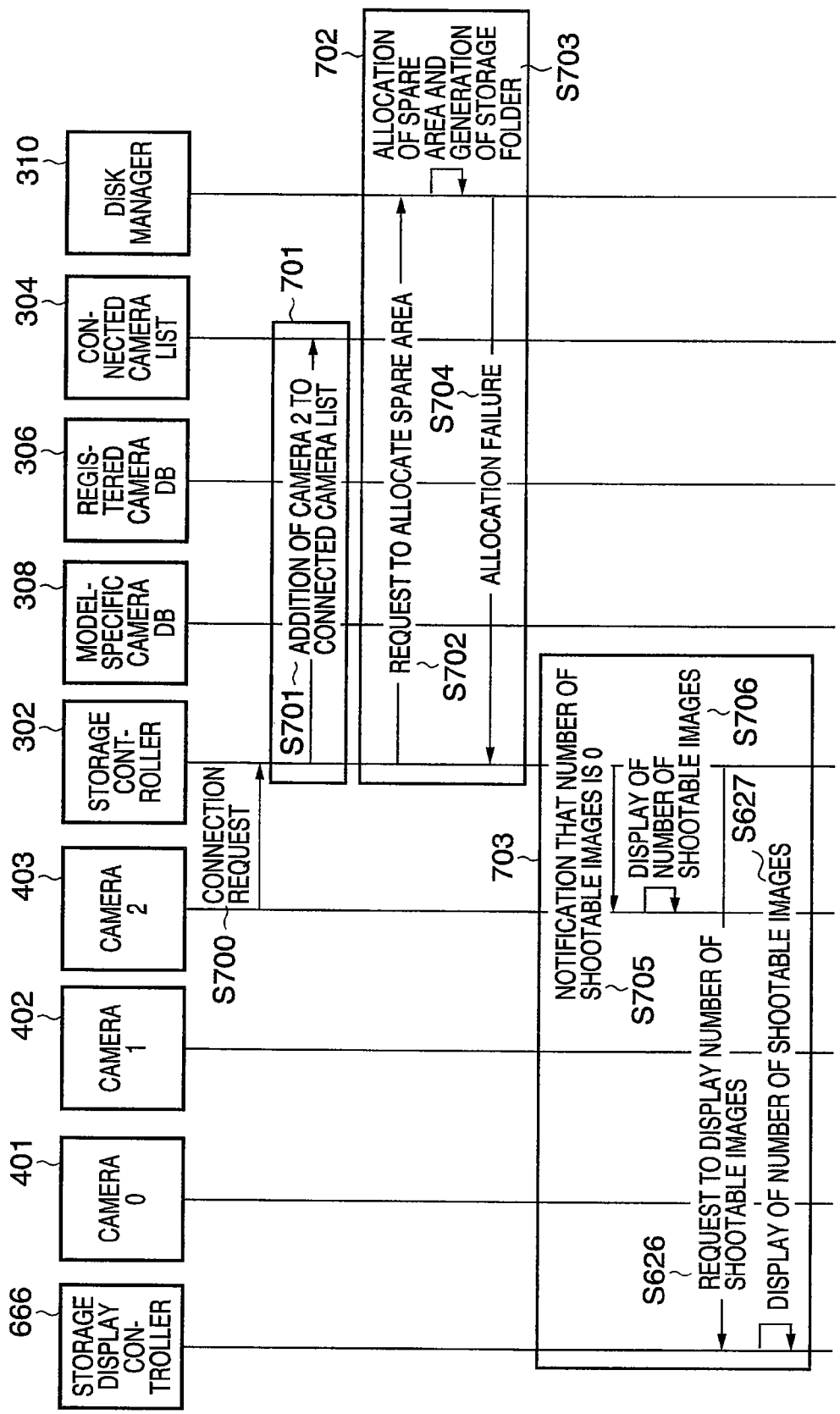
FIG. 8 is a sequence chart showing an operation between the digital camera and the portable remote storage.

A sequence when digital camera 2 is connected to the portable remote storage 313 under the following conditions will be explained with reference to FIG. 8. The conditions of this sequence are as follows:

Digital camera 2 was connected before, and has already been registered in the model-specific camera DB 308 and registered camera DB 306.

An area unused in the shared area for storing image data does not remain by the spare area of digital camera 2.

Digital camera 2 information registration processing 701 will be described. First, digital camera 2 requests the storage controller 302 to connect digital camera 2 (S700). In this case, digital camera 2 was connected before. Hence, on the basis of the pairing ID, the storage controller 302 links the connected camera list 304 to an entry to the registered camera DB 306 that corresponds to digital camera 2, and sets the current shooting mode (S701).

Next, storage area setting processing 702 will be described. The storage controller 302 requests the disk manager 310 to allocate a spare area in the shared area and create a storage folder (S702). Since no spare area can be allocated in the shared area, the disk manager 310 notifies the storage controller 302 of a spare area allocation failure (S703 and S704).

Shootable image count finalization processing 703 will be described. Since allocation of the spare area has failed, the storage controller 302 notifies digital camera 2 that the number of shootable images is 0 (S705).

The storage controller 302 requests the storage display controller 666 to display the number of shootable images (S626). The storage display controller 666 displays the number of shootable images on the display device 122_2 (S627).

When notified that the number of shootable images is 0, digital camera 2 cannot shoot any image though viewing of captured image data, and the like are possible. Digital camera 2 can shoot an image from this state only when the shared area is increased by deleting image data or disconnecting a connected digital camera, the spare area of digital camera 2 can be allocated, and the number of shootable images increases to one or more.

Figure 9A:
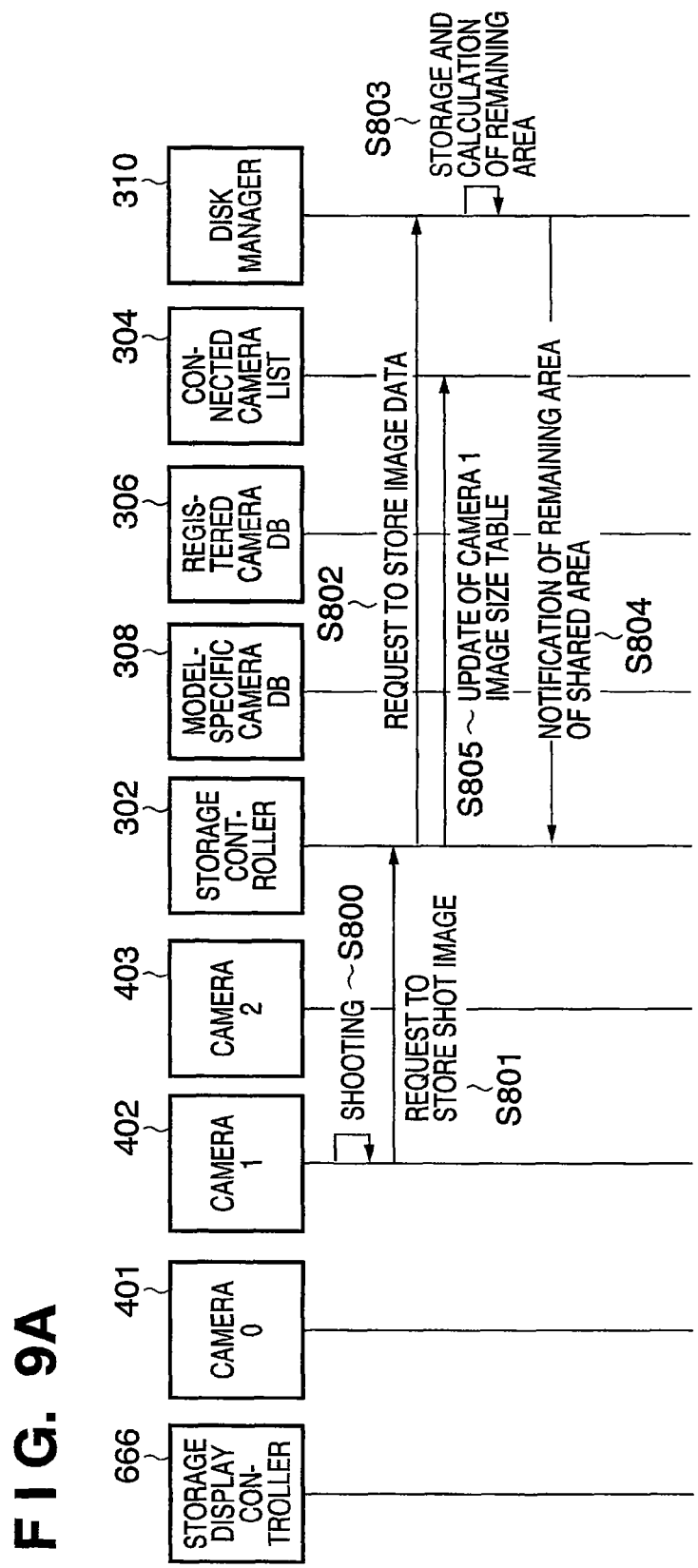
Figure 9B:
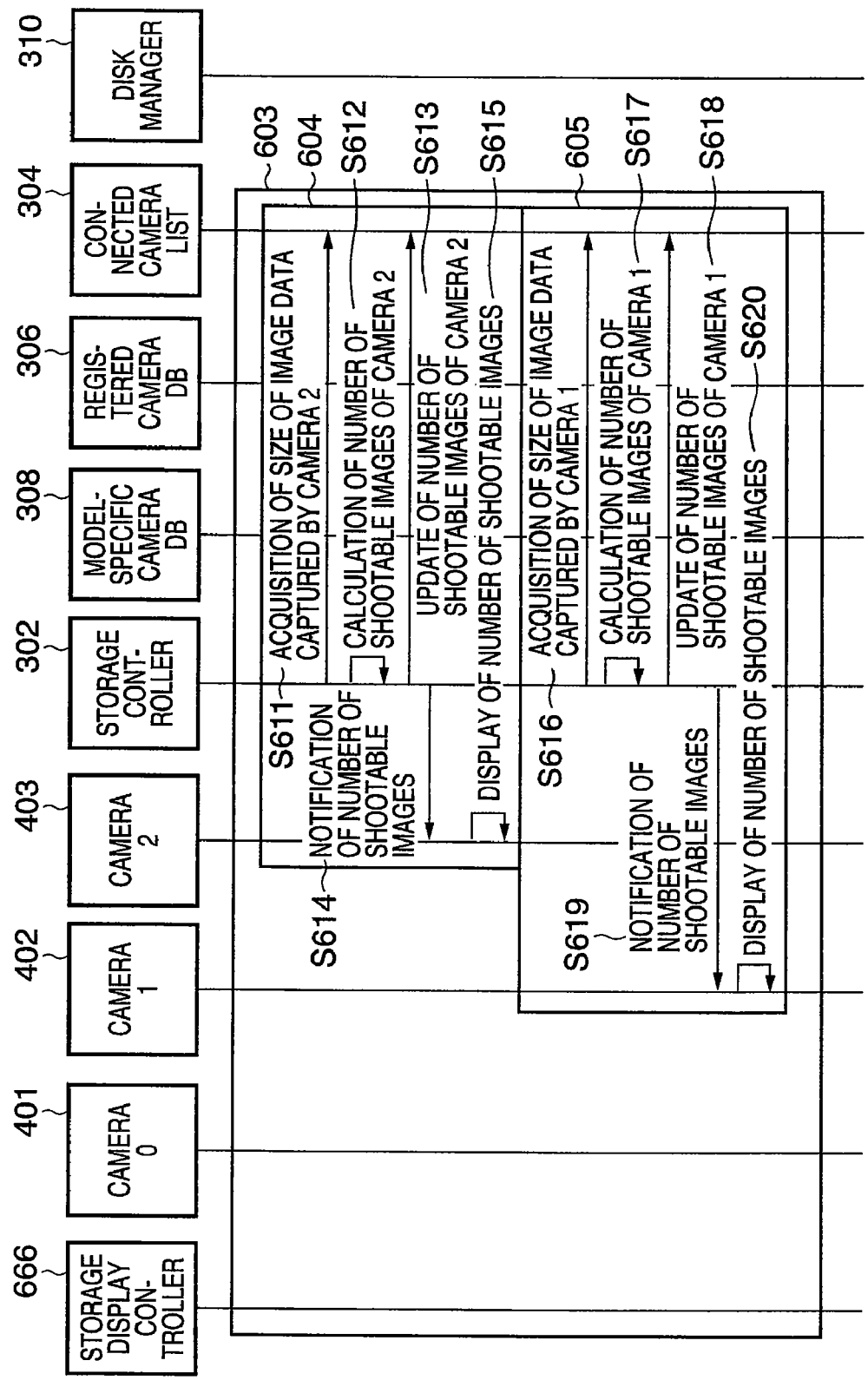
Figure 10A:
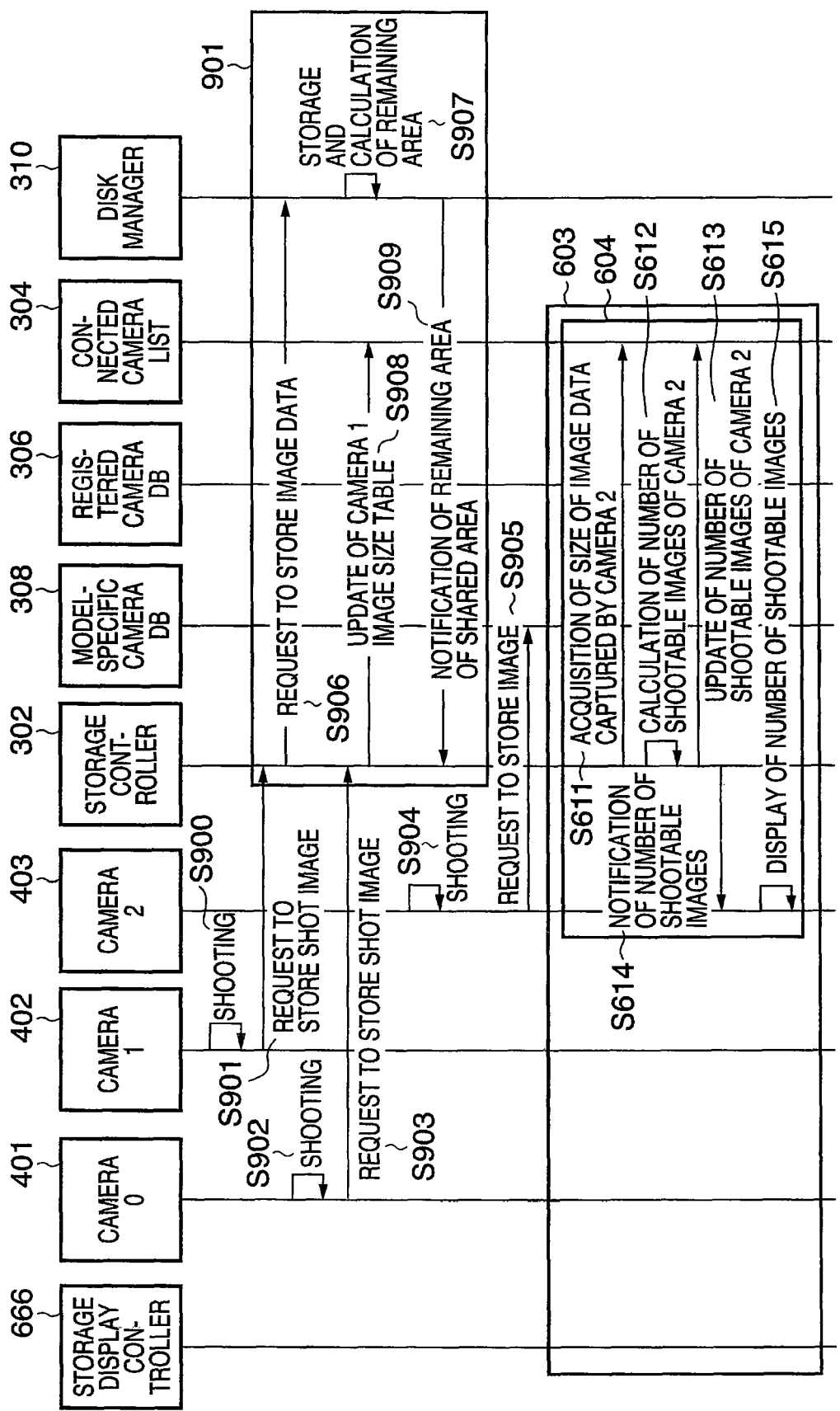
Figure 10B:
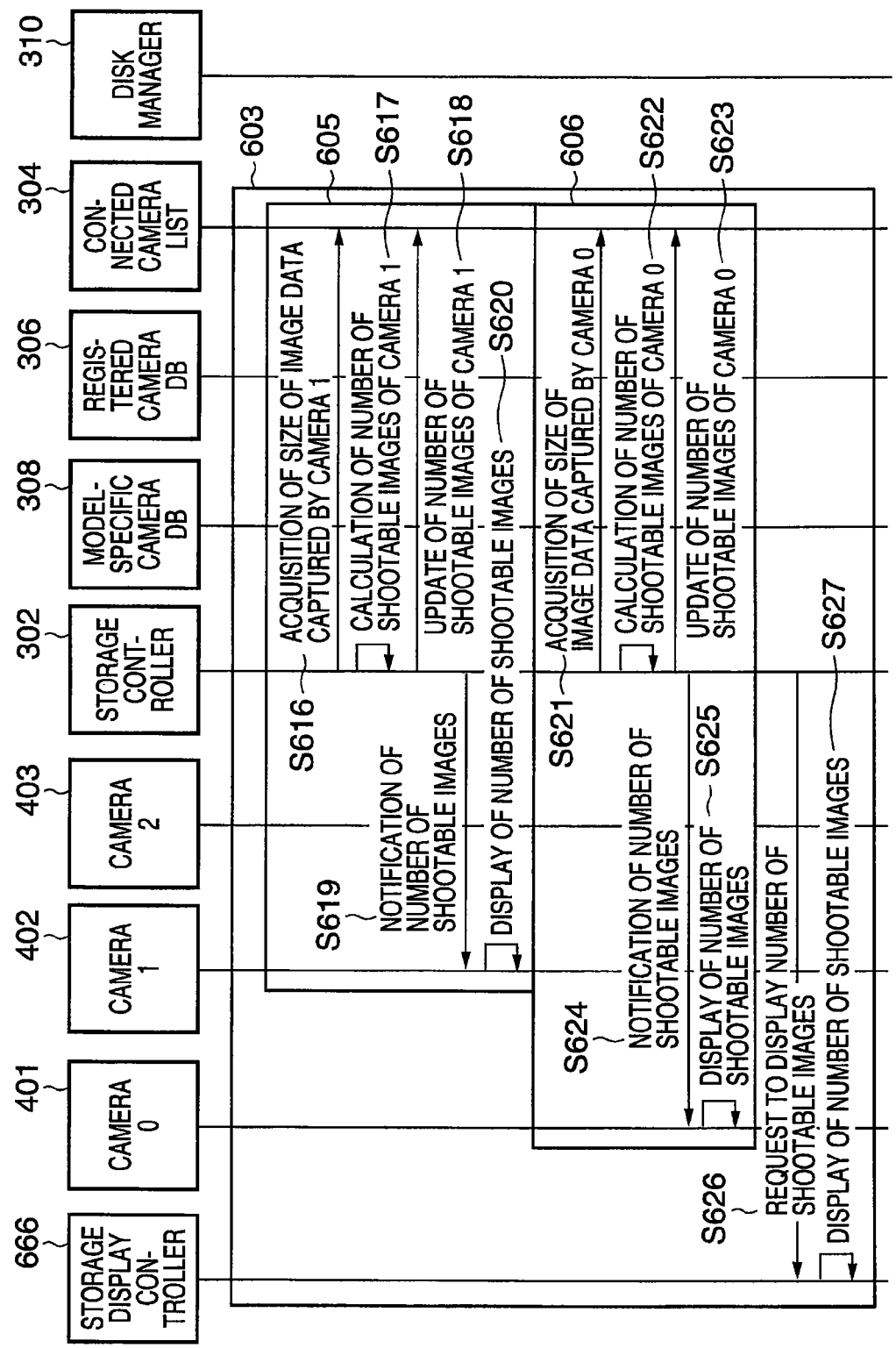
Figure 10C:
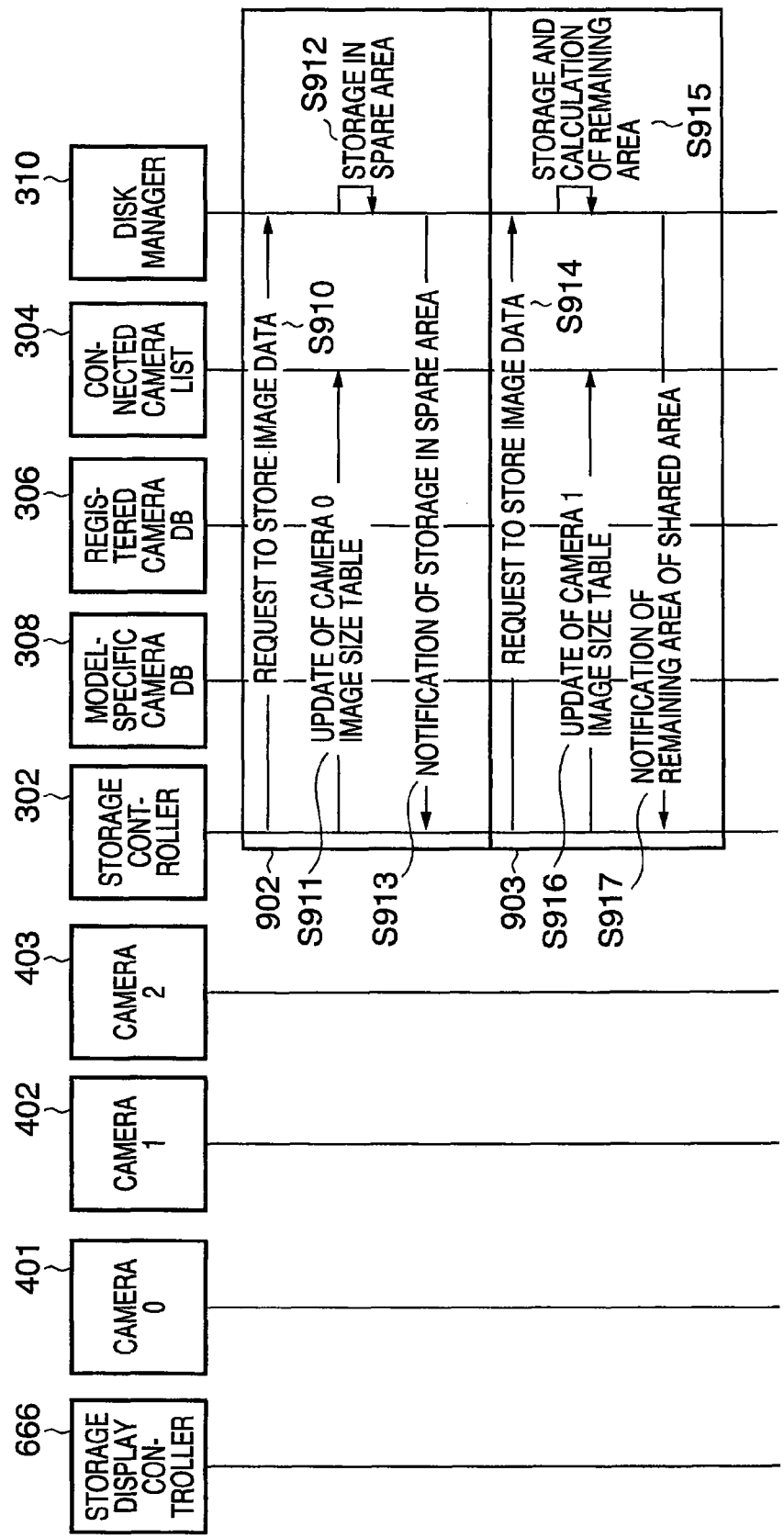

A sequence when captured image data is stored in the portable remote storage 313 under the following condition will be explained with reference to FIGS. 9A-9C. The condition of this sequence is that an area enough to store requested image data remains in the shared area. Rough processing sequences are image data storage processing, learned captured image data size table update processing, and the shootable image count finalization processing 603. The contents of the shootable image count finalization processing 603 are the same as those described with reference to FIGS. 7A-7C, and a description thereof will not be repeated.

The image data storage processing will be described first. Digital camera 1 shoots an image (step S800), and requests the storage controller 302 to store the image data (step S801).

The storage controller 302 requests the disk manager 310 to store the image data (step S802).

The disk manager 310 stores the captured image data of digital camera 1 in the shared area on the basis of the pairing ID (step S803).

The disk manager 310 calculates the remaining unused area of the shared area, and notifies the storage controller 302 of it (step S804).

While the disk manager 310 stores the image data, the storage controller 302 updates the captured image data size of digital camera 1 in the current shooting mode in the "learned captured image data size tables" for each model and individual (step S805).

The storage controller 302 executes the "shootable image count finalization processing" 603 for digital cameras 0, 1, and 2 which have been registered in the connected camera list 304 and for which the number of shootable images is 0 or more.

A sequence when the portable remote storage 313 stores captured image data under the following condition will be explained with reference to FIGS. 10A-10D. The conditions of this sequence are as follows:

Image data captured almost simultaneously by digital cameras 1, 0, and 2 in the order named are stored in the order of digital cameras 1, 0, and 2.

If image data of digital camera 1 is stored, image data captured by digital camera 0 cannot be stored in the shared area.

Image data of digital camera 2 to be processed third has a small data size and can be stored in the shared area.

Digital cameras 1, 0, and 2 almost simultaneously shoot images (S900, S902, and S904), and request the portable remote storage 313 to store their image data (S901, S903, and S905). The portable remote storage 313 first requests the disk manager 310 to store image data of digital camera 1 (S906). While the disk manager 310 stores the image data of digital camera 1, the storage controller 302 updates the captured image data size of digital camera 1 in the current shooting mode in the "learned captured image data size tables" for each model and individual (S908).

The disk manager 310 stores the captured image data of digital camera 1 in the shared area (S907), and notifies the storage controller 302 of the remaining area of the shared area (S909).

The storage controller 302 executes the "shootable image count finalization processing" 603 for digital cameras 0, 1, and 2 which have been registered in the connected camera list 304 and for which the number of shootable images is 0 or more.

After that, the storage controller 302 requests the disk manager 310 to store captured image data of digital camera 0 (S910).

Since the shared area does not have an area enough to store the captured image data of digital camera 0, the disk manager 310 stores the captured image data in the spare area of digital camera 0 (S912). The disk manager 310 notifies the storage controller 302 that the captured image data has been stored in the spare area (S913).

While the disk manager 310 stores the image data, the storage controller 302 updates the captured image data size of digital camera 0 in the current shooting mode in the "learned captured image data size tables" for each model and individual (S911).

Since the captured image data is stored in the spare area, the remaining area of the shared area does not change. Thus, the storage controller 302 requests the disk manager 310 to store captured image data of digital camera 2 (S914).

Since the shared area has an area enough to store the captured image data of digital camera 2, the disk manager 310 stores the captured image data in the shared area, calculates the shared area (S915), and notifies the storage controller 302 of the remaining area of the shared area (S917).

While the disk manager 310 stores the image data, the storage controller 302 updates the captured image data size of digital camera 2 in the current shooting mode in the "learned captured image data size tables" for each model and individual (S916).

The storage controller 302 executes the "shootable image count finalization processing" 603 for digital cameras 1 and 2 which have been registered in the connected camera list 304 and for which the number of shootable images is 0 or more.

Figure 11:
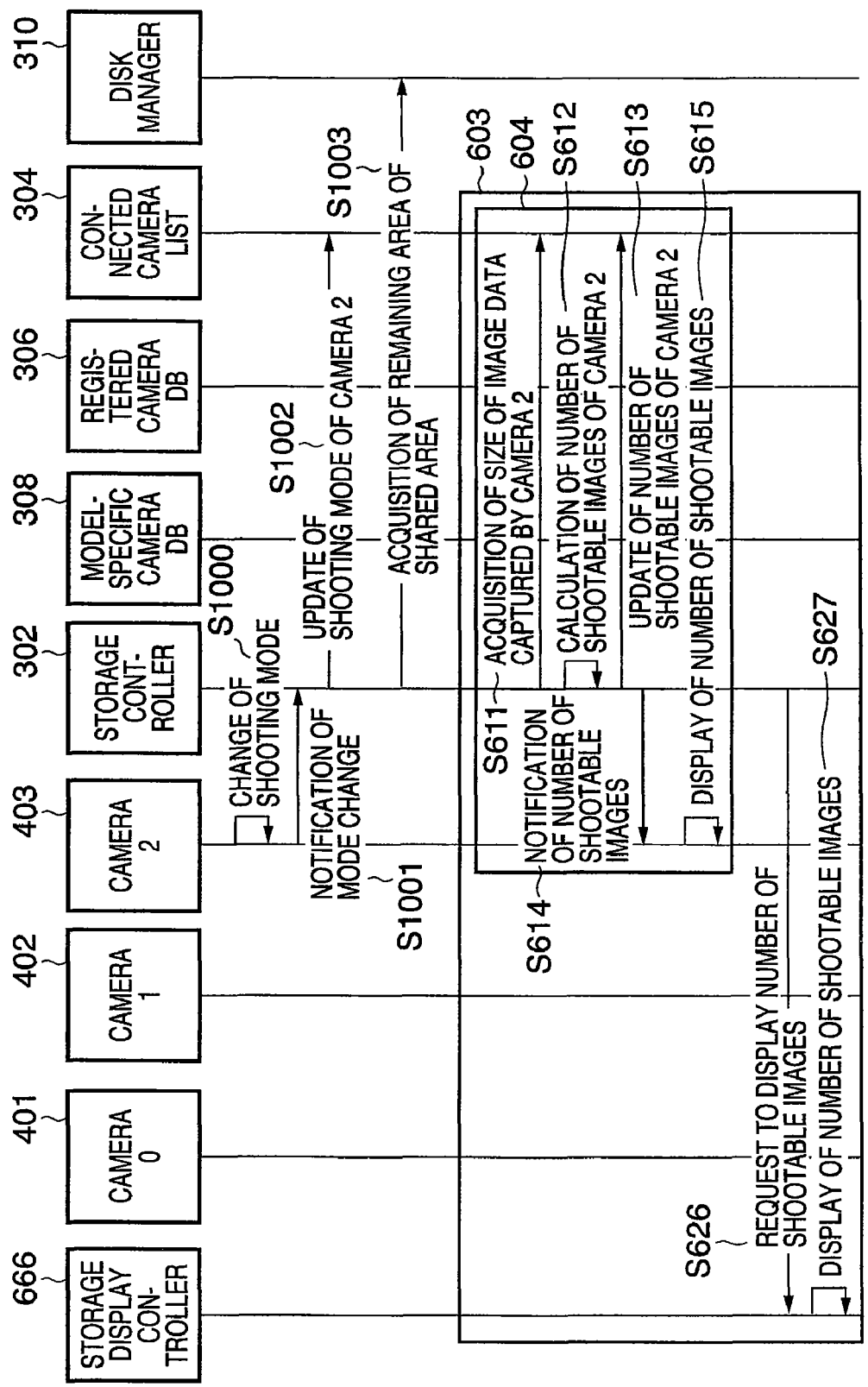
FIG. 11 is a sequence chart showing an operation between the digital camera and the portable remote storage.

A sequence when digital camera 2 changes the shooting mode will be explained with reference to FIG. 11. Digital camera 2 changes the shooting mode (S1000), and notifies the storage controller 302 of the change of the shooting mode (S1001). The storage controller 302 updates the shooting mode of digital camera 2 in the connected camera list 304 (S1002), and acquires the current remaining area of the shared area from the disk manager 310 (S1003).

The storage controller 302 updates the number of shootable images of digital camera 2 from the acquired remaining area of the shared area by the "shootable image count finalization processing" 603.

Figure 12B:
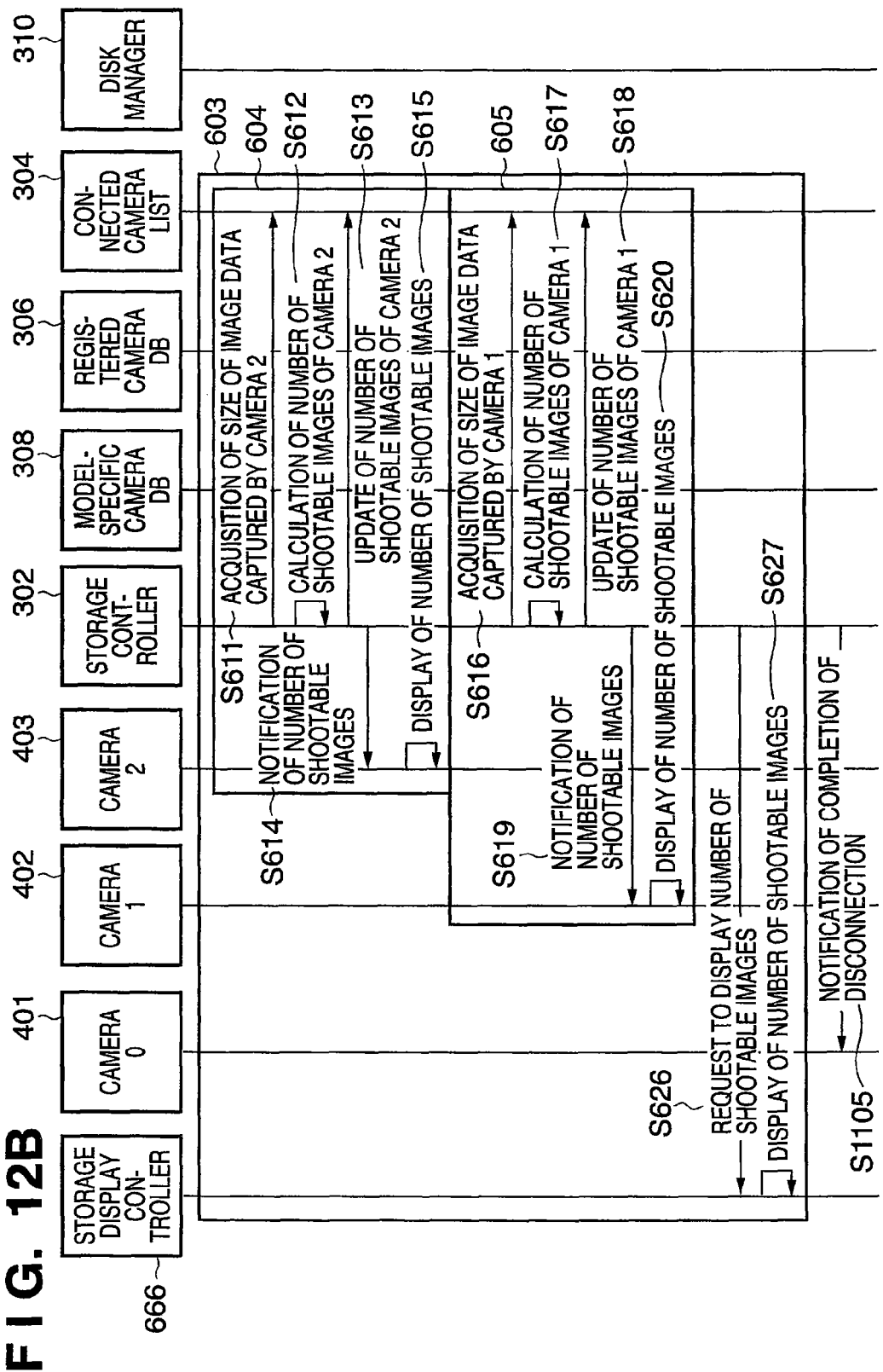

A sequence when digital camera 0 is disconnected from the portable remote storage 313 will be explained with reference to FIGS. 12A and 12B.

Digital camera 0 requests the storage controller 302 to disconnect digital camera 0 (S1100). In response to this, the storage controller 302 deletes digital camera 0 from the connected camera list 304 (S1101), and requests the disk manager 310 to deallocate the spare area of digital camera 0 (S1102).

The disk manager 310 deallocates the entire spare area if the spare area is not used, or the remaining area of the spare area when the spare area is used (S1103).

If there is any of the digital cameras 401 to 403 whose spare area cannot be allocated, the disk manager 310 ensures the spare area of the digital camera from the deallocated area. Then, the disk manager 310 notifies the storage controller 302 of the remaining area of the shared area (S1104).

If there is no digital camera whose spare area cannot be allocated, the disk manager 310 adds the deallocated area to the shared area, and notifies the storage controller 302 of the updated remaining area of the shared area (S1104).

When notified of the remaining area of the shared area, the storage controller 302 executes "shootable image count finalization processing" for digital cameras 1 and 2 which have been registered in the connected camera list 304 and for which the number of shootable images is 0 or more. The storage controller 302 notifies digital camera 0 of the completion of disconnection (S1105).

Figure 13:
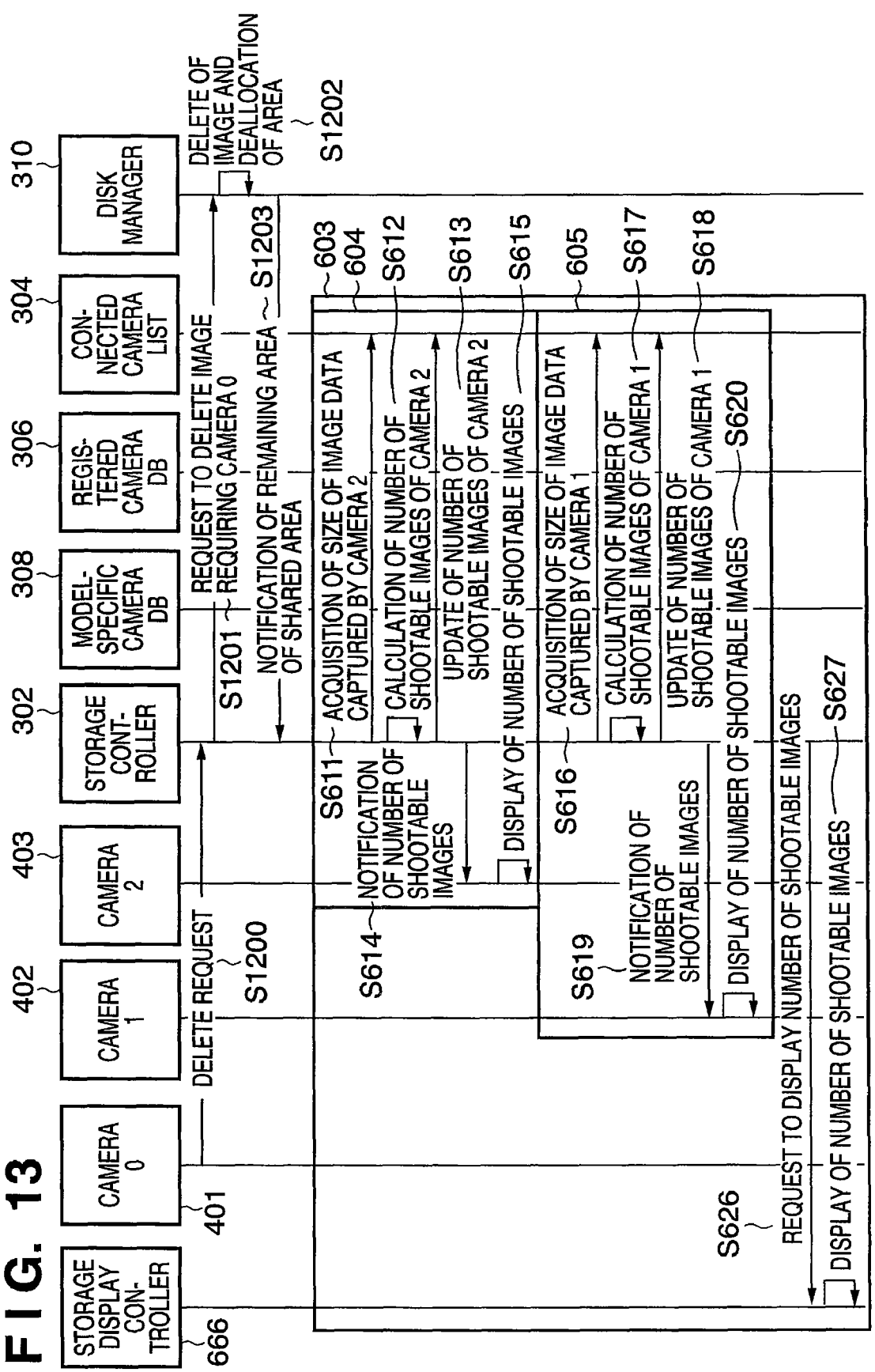
FIG. 13 is a sequence chart showing an operation between the digital camera and the portable remote storage.

A sequence when captured image data is deleted from digital camera 0 will be explained with reference to FIG. 13.

Digital camera 0 requests the storage controller 302 to delete image data (S1200). The storage controller 302 issues a delete request to the disk manager 310 (S1201). The disk manager 310 deletes the designated image data and deallocates the area (S1202).

If there is any of the digital cameras 401 to 403 whose spare area cannot be allocated, the disk manager 310 ensures the spare area of the digital camera from the deallocated area. Then, the disk manager 310 notifies the storage controller 302 of the remaining area of the shared area (S1203).

If there is no digital camera whose spare area cannot be allocated, the disk manager 310 adds the deallocated area to the shared area, and notifies the storage controller 302 of the updated remaining area of the shared area (S1203).

When notified of the remaining area of the shared area, the storage controller 302 executes "shootable image count finalization processing" for digital cameras 1 and 2 which have been registered in the connected camera list 304.

Figure 28B:
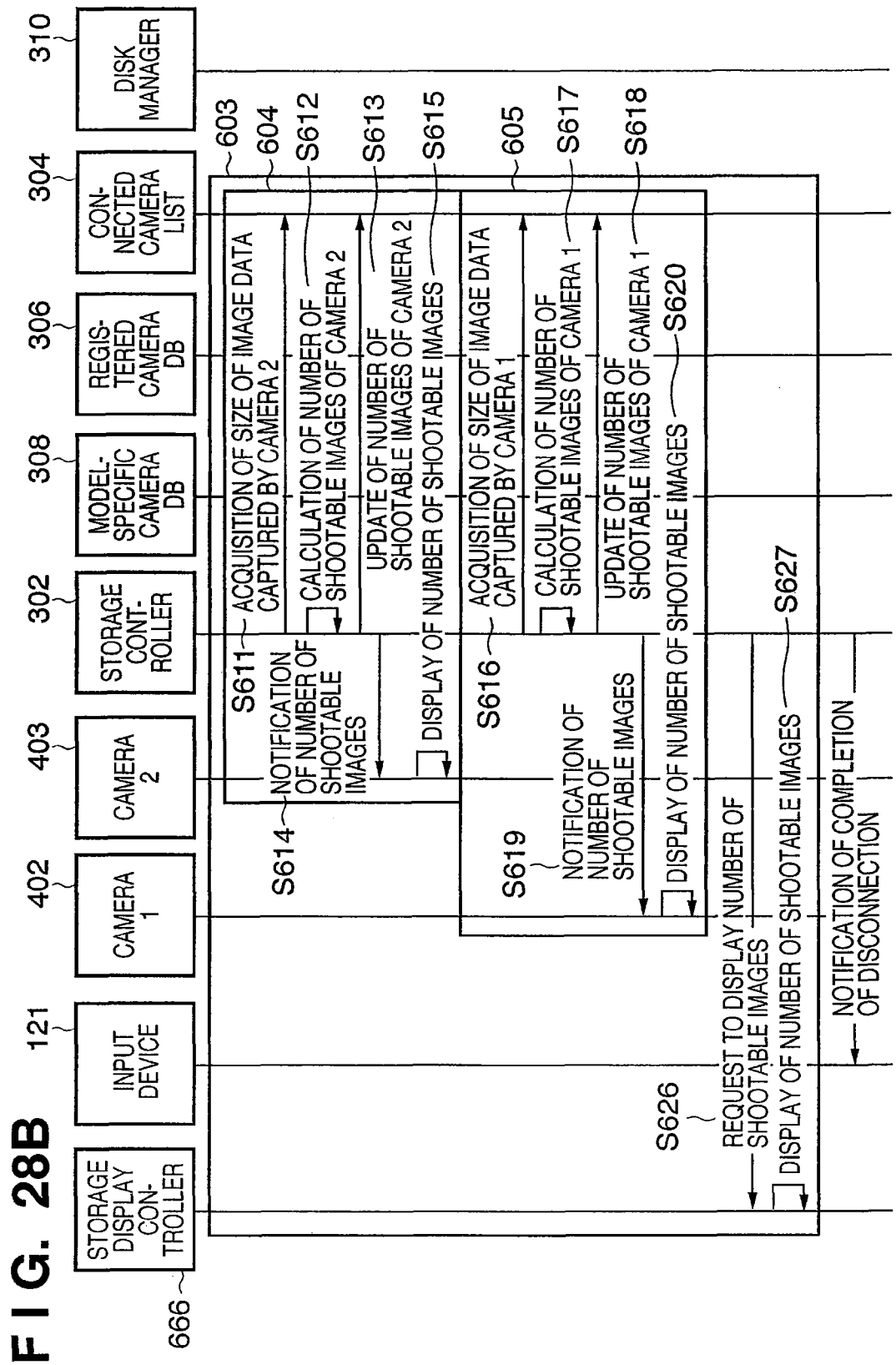

A sequence when captured image data is deleted from the input device 121 of the portable remote storage 313 will be explained with reference to FIGS. 28A and 28B.

The input device 121 of the portable remote storage 313 issues an image data delete request (S2700). The storage controller 302 issues the delete request to the disk manager 310 (S2701). The disk manager 310 deletes the designated image data and deallocates the area (S2702).

If there is a digital camera whose spare area cannot be allocated, the disk manager 310 ensures the spare area of the digital camera from the deallocated area. Then, the disk manager 310 notifies the storage controller 302 of the remaining area of the shared area (S2703).

If there is no digital camera whose spare area cannot be allocated, the disk manager 310 adds the deallocated area to the shared area, and notifies the storage controller 302 of the updated remaining area of the shared area (S2703).

The storage controller 302 executes the "shootable image count finalization processing" 603 for digital cameras 1 and 2 which have been registered in the connected camera list 304 and for which the number of shootable images is 0 or more.

<Description of Tables Used to Calculate Number of Shootable Images>

The "default captured image data size table", "learned captured image data size table" for each individual, and "learned captured image data size table" for each model which are used to calculate the number of shootable images in the above-described sequences will be explained in detail.

These tables are stored in the flash ROM 109 of the portable remote storage 313, and expanded in the DRAM 108 while the system runs.

<Description of "Default Captured Image Data Size Table">

The "default captured image data size table" is held for each model. The model is determined by the firmware version of the model. As shown in FIG. 5, this table holds the standard image data size per image (per unit image count) corresponding to the image data compression ratio and the number of recording pixels. This table also holds the standard moving image data size per second (per unit recording time) corresponding the moving image frame rate and the number of recording pixels. This table further holds the buffer size of the target model.

<Description of "Learned Captured Image Data Size Table" for Each Individual>

The "learned captured image data size table" for each individual is created to increase the calculation precision of the number of shootable images on the basis of the owner's shooting tendency. As shown in FIG. 6, this table holds the average image data size per image (per unit image count) corresponding to the image data compression ratio and the number of recording pixels, and holds the total number of shots in the target shooting mode. This table also holds the average moving image data size per second (per unit recording time) corresponding the moving image frame rate and the number of recording pixels, and holds the total shooting time (sec) in the target shooting mode. In addition, this table holds the buffer size of the target model.

The average captured image data size held in the "learned captured image data size table" is calculated by (previous average image data size×previous total number of shots+current captured image data size) ÷current total number of shots=average-captured image data size <Description of "Learned Captured Image Data Size Table" for Each Model>

The "learned captured image data size table" for each model is created to increase the precision of the number of shootable images even for a digital camera connected for the first time. This table has the same items as those of the "learned captured image data size table" for each individual. Sample data is the size of image data captured by the same model regardless of an individual camera, and the average is calculated to create the table.

<Description of Algorithm to Select Three Tables>

Figure 29:
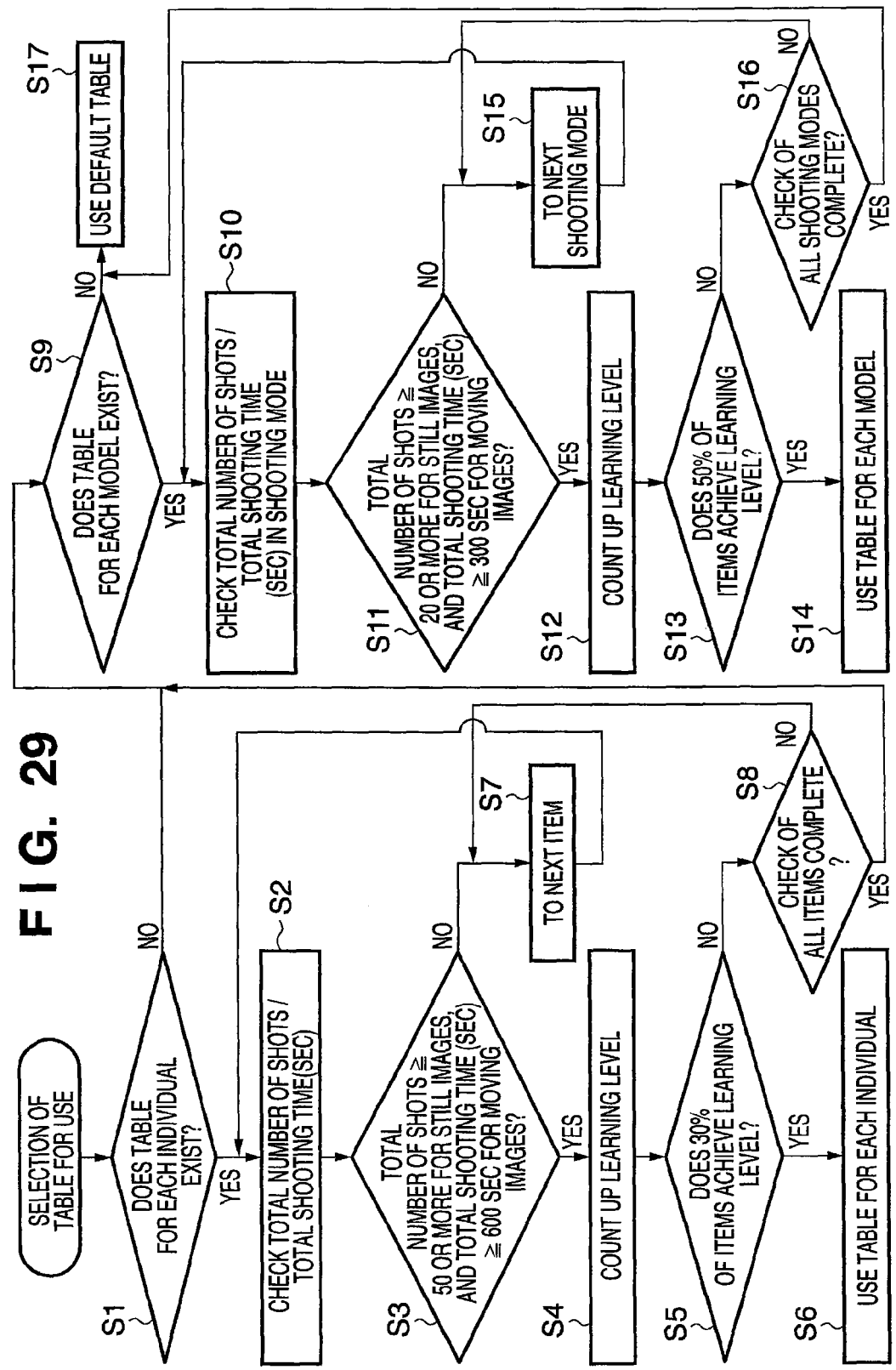
FIG. 29 is a flowchart showing the sequence of captured image data size selection processing in the portable remote storage.

A table actually used to calculate the number of shootable images is selected from the above-mentioned three tables. A state in which a predetermined number of captured image data size samples are obtained is defined as achievement of the learning level. When the learning level is achieved, the "learned captured image data size table" is employed. The selection algorithm will be explained with reference to the flowchart of FIG. 29.

The storage controller 302 determines whether there is a "learned captured image data size table" for each individual corresponding to a target digital camera (S1). If there is a "learned captured image data size table" for each individual, the storage controller 302 checks the total number of shots as for an item associated with the still image shooting mode and the total shooting time (sec) as for an item associated with the moving image shooting mode (S2).

The storage controller 302 determines as a result of the check in S2 whether the total number of shots is 50 or more or the total shooting time (sec) is 600 sec or more (S3). If the total number of shots is 50 or more or the total shooting time (sec) is 600 sec or more, the storage controller 302 counts up this item as an item which achieves a predetermined learning level (the total number of shots is 50 or more or the total shooting time (sec) is 600 sec or more) (S4).

The storage controller 302 determines whether the ratio of items having achieved the predetermined learning level to all items in the "learned captured image data size table" for each individual is 30% or more (S5). If the ratio of items having achieved the predetermined learning level is 30% or more, i.e., the total number of shots is 50 or more or the total shooting time (sec) is 600 sec or more in 30% or more of items, the "learned captured image data size table" for each individual is used to calculate the number of shootable images.

For example, in the table shown in FIG. 6, the total number of shots is 50 or more or the total shooting time (sec) is 600 sec or more in one of 15 items.

If the ratio of items having achieved the predetermined learning level is less than 30%, the storage controller 302 determines whether it has checked all the items (S8). If the storage controller 302 has not checked all the items, it shifts the check target to the next item (S7), and executes the check in S2. If the storage controller 302 has checked all the items but the ratio of items having achieved the predetermined learning level is less than 30%, the storage controller 302 determines whether there is a "learned captured image data size table" for each model corresponding to the target digital camera (S9). Also when the storage controller 302 determines in S1 that there is no "learned captured image data size table" for each individual, the process shifts to S9.

If there is a "learned captured image data size table" for each model, the storage controller 302 checks the total number of shots as for an item associated with the still image shooting mode and the total shooting time (sec) as for an item associated with the moving image shooting mode (S10).

The storage controller 302 determines as a result of the check in S10 whether the total number of shots is 20 or more or the total shooting time (sec) is 300 sec or more (S1). If the total number of shots is 20 or more or the total shooting time (sec) is 300 sec or more, the storage controller 302 counts up this item as an item which achieves a predetermined learning level (the total number of shots is 20 or more or the total shooting time (sec) is 300 sec or more) (S12).

The storage controller 302 determines whether the ratio of items having achieved the predetermined learning level to all items in the "learned captured image data size table" for each model is 50% or more (S13). If the ratio of items having achieved the predetermined learning level is 50% or more, i.e., the total number of shots is 20 or more or the total shooting time (sec) is 300 sec or more in 50% or more of items, the "learned captured image data size table" for each model is used to calculate the number of shootable images.

Note that only notification of the number of shootable image data has been described. As another notification example, the portable remote storage 313 can also calculate the moving image data recordable time on the basis of the table shown in FIG. 5 or 6 and the remaining area of the shared area, and notify the digital cameras 401 to 403 of it. In this case, the digital cameras 401 to 403 are notified of either the number of shootable images or the recordable time, and display the notified information on the display devices 222. The display device 122_1 of the portable remote storage 313 also displays either the number of shootable images or the recordable time.

The size of the spare area is ensured using capacity information on the buffer sizes of the digital cameras 401 to 403. When connected to the portable remote storage 313, the digital cameras 401 to 403 notify the portable remote storage 313 of the capacity information on the buffer sizes of the digital cameras 401 to 403. The portable remote storage can also obtain the capacity information on the buffer sizes of the digital cameras 401 to 403 by downloading product information from a Web site or the like.

If the ratio of items having achieved the predetermined learning level is less than 50%, the storage controller 302 determines whether it has checked all the items (S16). If the storage controller 302 has not checked all the items, it shifts the check target to the next item (S15), and executes the check in S10. If the storage controller 302 has checked all the items but the ratio of items having achieved the predetermined learning level is less than 50%, the storage controller 302 adopts the "default captured image data size table" (S17). Also when the storage controller 302 determines in S9 that there is no "learned captured image data size table" for each model, the process shifts to S17.

As described above, according to the first embodiment, the portable remote storage 313 calculates the number of shootable images and the recordable time, and notifies the digital cameras 401 to 403 of them. The connected digital cameras 401 to 403 need not periodically inquire the remaining area of the shared area, the number of shootable images, or the like of the portable remote storage 313, reducing the load on the digital cameras 401 to 403.

In the first embodiment, spare areas (exclusive storage areas) are assigned to a plurality of external apparatuses. Thus, the first embodiment can prevent a data storage failure caused by the time lag of, e.g., a shootable image count notification from the portable remote storage 313.

Note that only notification of the number of shootable image data has been described. As another notification example, the portable remote storage 313 can also calculate the moving image data recordable time on the basis of the table shown in FIG. 5 or 6 and the remaining area of the shared area, and notify the digital cameras 401 to 403 of it. In this case, the digital cameras 401 to 403 are notified of either the number of shootable images or the recordable time, and display the notified information on the display devices 222. The display device 122_1 of the portable remote storage 313 also displays either the number of shootable images or the recordable time.

Second Embodiment

The second embodiment of the present invention will be described.

The second embodiment is different from the first embodiment in function (5) of displaying saved image data on the display device 222 of the digital cameras 401. An example of displaying saved image data on display devices 222 of digital cameras 401 to 403 in the second embodiment will be explained.

(Case Where Digital Camera Displays Image Data Captured by It)

Figure 24:
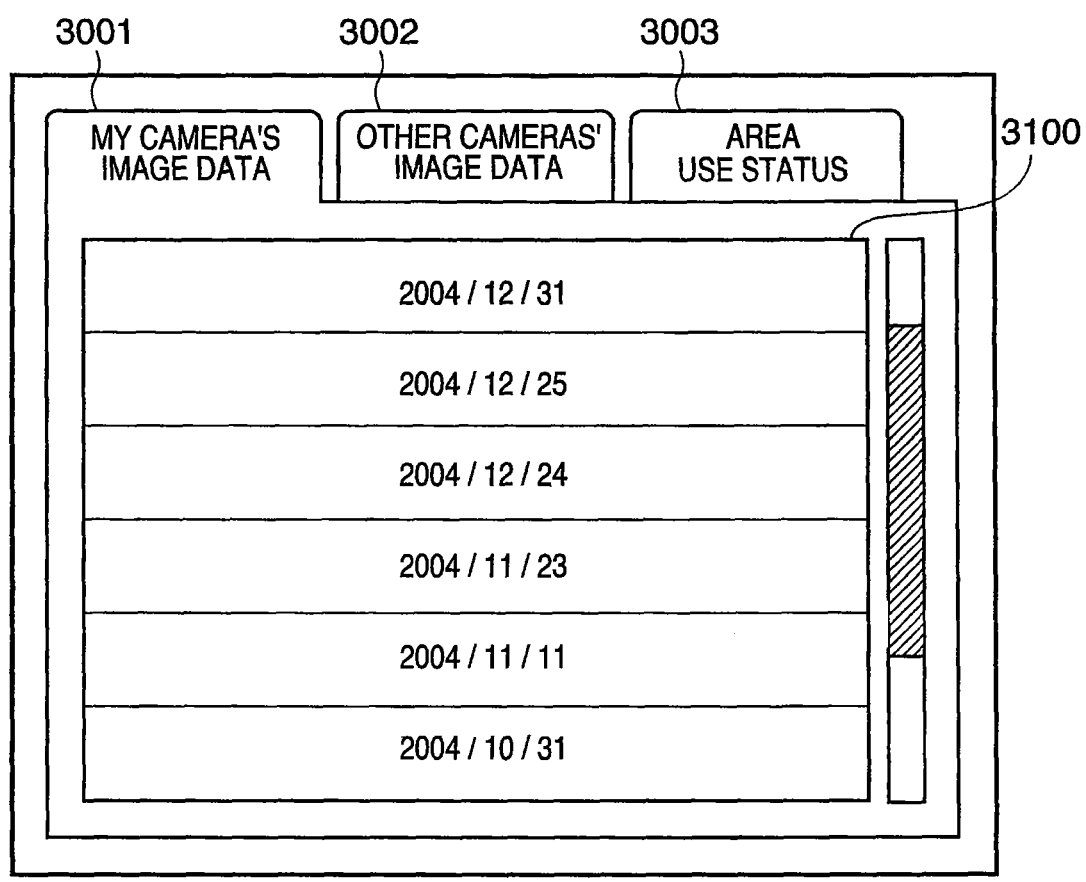
FIG. 24 is a view showing a window example displayed on the display device of the digital camera.
Figure 26:
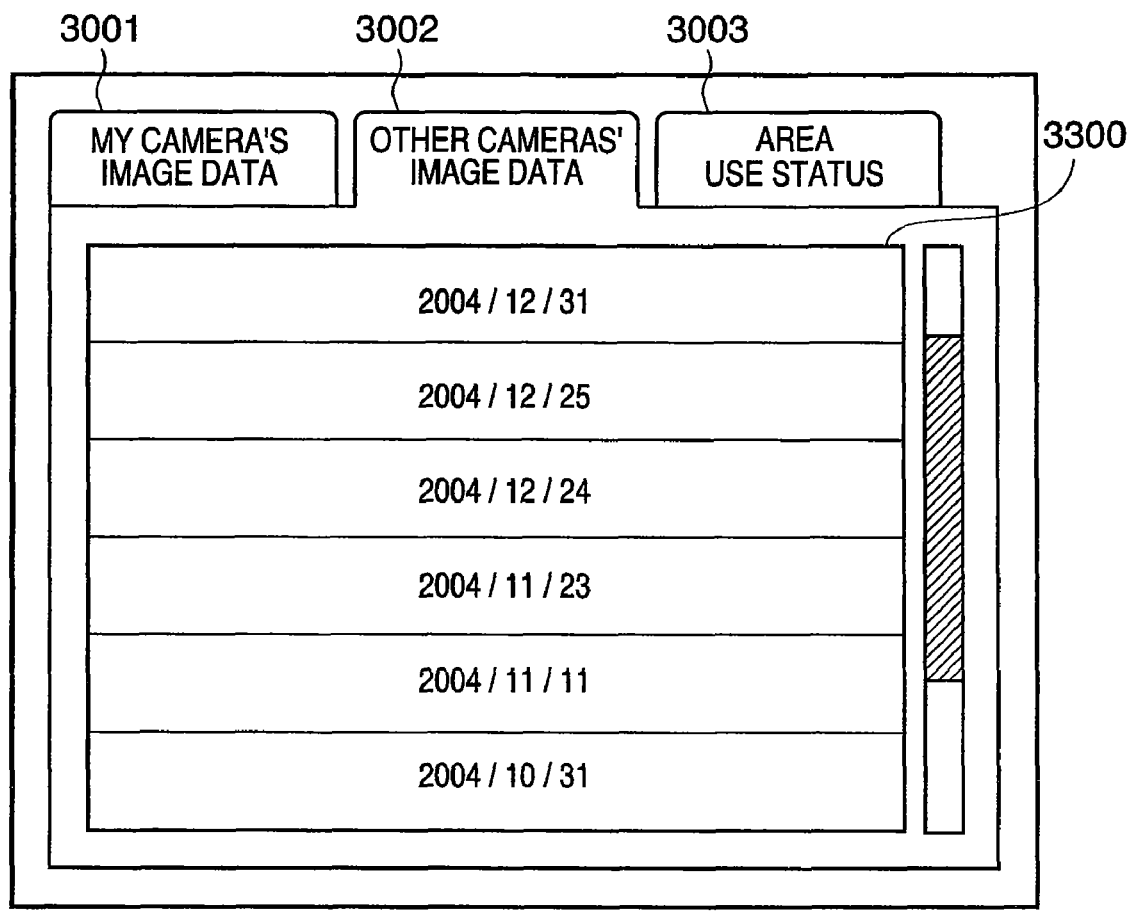
FIG. 26 is a view showing a window example displayed on the display device of the digital camera.

A case where a digital camera displays image data captured by it and saved in a portable remote storage 313 will be explained. Image data currently captured by a digital camera in operation can be displayed in the same playback mode as that of a conventional digital camera. To display image data captured in the past by a digital camera in operation, the user selects "My camera's image data 3001" with the cross key of an input device 221, as shown in FIG. 24, and presses the SET button of the input device 221. Then, a list of folders defined by date is displayed. The user can select a desired folder from the list.

Figure 22:
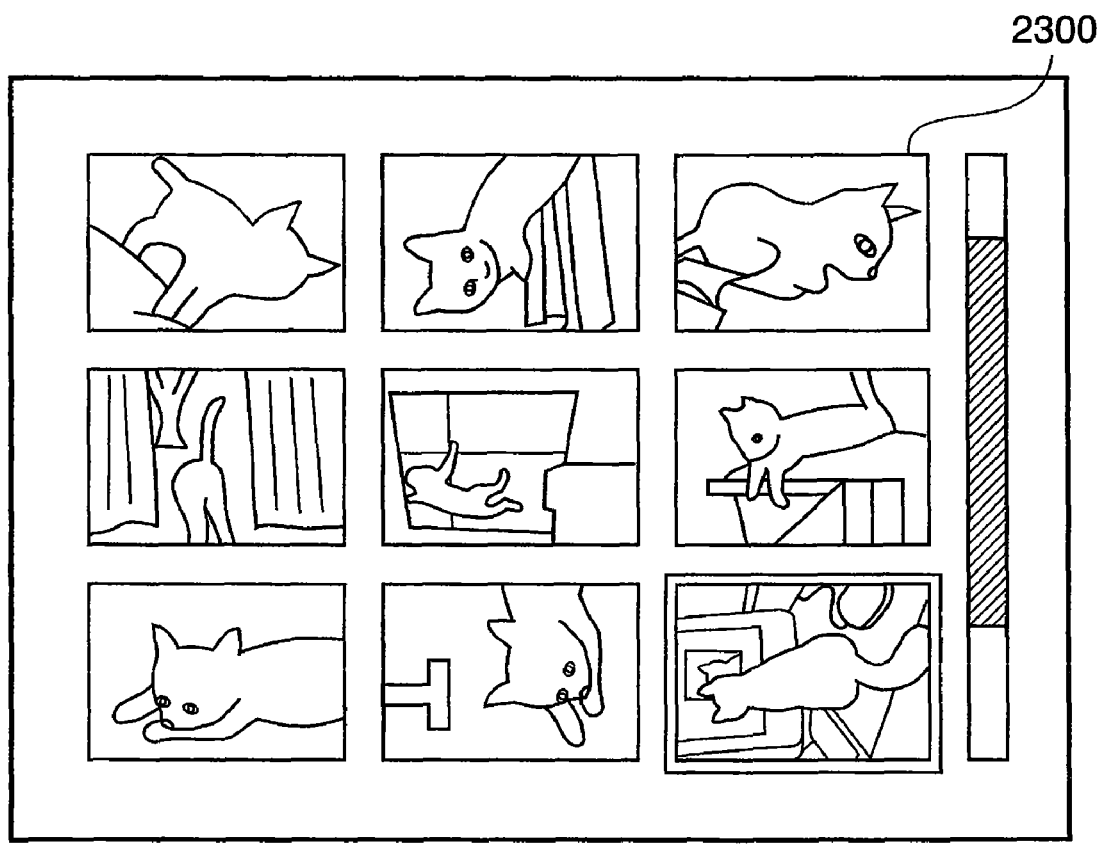
FIG. 22 is a view showing a window example displayed on the display device of the digital camera.

After the user selects the desired folder, the thumbnails of image data in the folder are displayed as shown in FIG. 22. The user can use the cross key and SET button to select the thumbnail of desired image data. After the user selects the thumbnail, the actual image of the selected thumbnail is displayed as shown in FIG. 16.

A case where a digital camera displays image data captured by another digital camera and saved in the portable remote storage 313 will be explained.

The user selects "other cameras' image data 3002" with the cross key of the input device 221, as shown in FIG. 25, and presses the SET button of the input device 221. Then, a list of other digital cameras is displayed, and the user selects one digital camera from the list with the cross key and presses the SET button.

After the user selects one digital camera from the list, a list of folders defined by date for the selected digital camera is displayed. The user selects a desired folder from the list with the cross key, and presses the SET button.

After the user selects the desired folder in this way, the thumbnails of image data in the folder are displayed as shown in FIG. 22. The user can use the cross key and SET button to select the thumbnail of desired image data. After the user selects the thumbnail, the actual image of the selected thumbnail is displayed as shown in FIG. 16.

Third Embodiment

The third embodiment of the present invention will be described.

A system according to the third embodiment is different from the first embodiment in a table used to calculate the number of shootable images. In the system according to the third embodiment, two tables each having an average captured image data size in shooting are created with a previous shooting date and current shooting date, in addition to the three tables described in the first embodiment. A table created with a previous shooting date includes tables created for each of digital cameras 401 to 403 and each model. The average of the sizes of image data captured with a previous date is calculated and registered in a corresponding item in FIG. 6. A table created with a current shooting date includes tables created for each of the digital cameras 401 to 403 and each model. The average of the sizes of image data captured with a current date is calculated and registered in a corresponding item in FIG. 6.

These tables are used as indices of the latest captured image data size tendency. It is preferable to use a table created with a current shooting date preferentially to one created with a previous shooting date. When the latest captured image data size tendency is important, both tables created with current and previous shooting dates are employed preferentially to the above-mentioned "learned captured image data size tables" for each individual and model. As for tables created with current and previous dates, a table created for each individual is used preferentially to one created for each model.

As shown in FIG. 6, these tables hold the average image data size per image corresponding to the image data compression ratio and the number of recording pixels, and holds the total number of shots in the shooting mode. This table also holds the average moving image data size per second corresponding the moving image frame rate and the number of recording pixels, and the total shooting time (sec) in each shooting mode. In addition, this table holds the buffer size of the model.

Fourth Embodiment

The fourth embodiment of the present invention will be described. Digital cameras 401 to 403 notify a portable remote storage 313 of the presence/absence of a shootable image count display function together with a connection request. For example, when a digital camera cannot display the number of shootable images or the number of display digits is limited, the number of shootable images is not necessary every shooting. For this reason, only when the number of shootable images becomes 0 as a result of shooting with a target digital camera or another digital camera and when the target digital camera consumes its spare area and the number of shootable images becomes 0, the portable remote storage 313 notifies the target digital camera of a message to this effect.

Similar to the first embodiment, registration processing 601 for information on the digital cameras 401 to 403, storage area setting processing 602, and shootable image count finalization processing 603 are performed. The third embodiment is different from the first embodiment only in that the portable remote storage 313 does not notify, of the number of shootable images in the shootable image count finalization processing 603, any of the digital cameras 401 to 403 that cannot display the number of shootable images.

Fifth Embodiment

The fifth embodiment of the present invention will be described. An outline of the difference from the first embodiment will be explained. When digital cameras 401 to 403 perform one of the following three processes and notify a portable remote storage 313 that the digital camera has performed the process, the portable remote storage 313 notifies, of the number of shootable images, only the digital cameras which have performed the process. The three processes are A digital camera is turned on.

A digital camera changes the mode.

A digital camera shoots an image.

The portable remote storage 313 notifies, of the number of shootable images, even the digital cameras 401 to 403 for which the number of shootable images becomes 0 as a result of shooting with another digital camera.

No spare area is deallocated unless the digital cameras 401 to 403 are explicitly disconnected from the portable remote storage 313. Thus, when the digital cameras 401 to 403 are turned on, they can shoot images by at least their spare areas.

Figure 30:
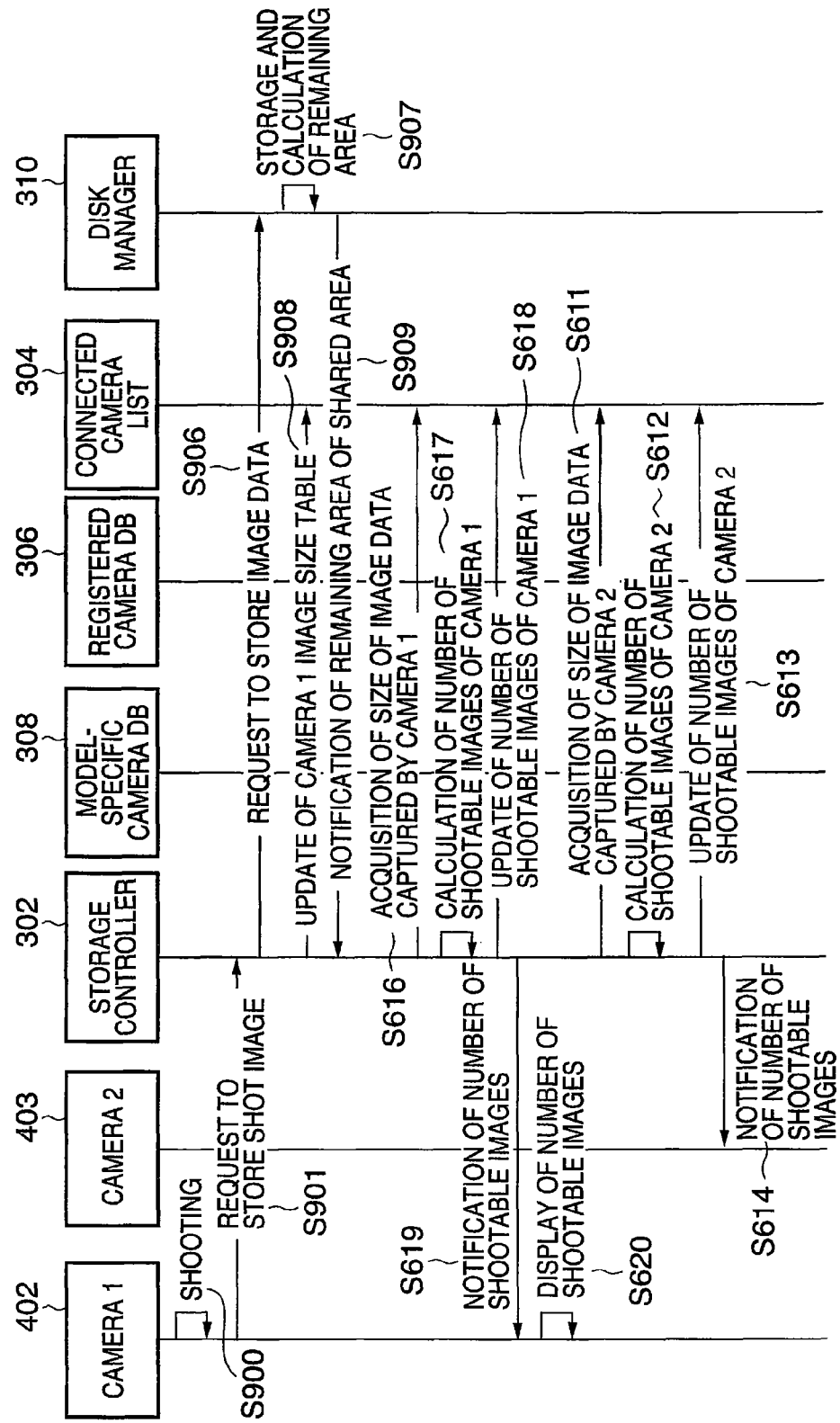
FIG. 30 is a sequence chart showing a shootable image count notification operation between the digital camera and the portable remote storage.

A sequence for notification of the number of shootable images between the digital camera and the portable remote storage 313 according to the third embodiment will be explained with reference to FIG. 30.

When digital camera 1 shoots an image (S900), it requests a storage controller 302 to store the shot image (S901). The storage controller 302 requests a disk manager 310 to store the image data of digital camera 1 (S906).

While the disk manager 310 stores the image data of digital camera 1, the storage controller 302 updates the captured image data size of digital camera 1 in the current shooting mode in the "learned captured image data size tables" for each model and individual (S908).

The disk manager 310 stores the captured image data of digital camera 1 in the shared area (S907), and notifies the storage controller 302 of the remaining area of the shared area (S909).

The storage controller 302 tracks a link from an entry in a connected camera list 304 to a registered camera DB 306, and acquires a captured image data size in the current shooting mode (S616 and S611).

The storage controller 302 calculates the number of shootable images by dividing the remaining area of the shared area notified in S909 by the captured image data size in the current shooting mode (S617 and S612)

The storage controller 302 updates the number of shootable images in the connected camera list 304 to the calculated one (S618 and S613).

The storage controller 302 notifies, of the calculated number of shootable images, connected digital camera 1 which have transmitted the shot image (S619).

Digital camera 1 displays the notified number of shootable images on a display device 222 of digital camera 1 (S620).

The storage controller 302 notifies connected digital camera 2 that the number of shootable images becomes 0 as a result of shooting with digital camera 1 (S614). Digital camera 2 shifts to the shooting inhibition mode.

Sixth Embodiment

The sixth embodiment of the present invention will be described.

An outline of the difference from the first embodiment will be explained. The sixth embodiment is different from the first embodiment in the following three points.

First, the size of the spare area is determined not by the buffer sizes of connected digital cameras 401 to 403, but by the current continuous shooting mode of the digital cameras 401 to 403.

Second, the shootable image count calculation equation is different from the first embodiment.

Finally, the digital cameras 401 to 403 calculate the number of shootable images.

Information used to allocate a spare area is attained on the basis of the current continuous shooting mode of the digital cameras 401 to 403. The continuous shooting mode includes single shooting, continuous shooting, and bracketing. The allocated spare area has the average image data size in the current shooting mode×5 images for single shooting, the buffer size for continuous shooting, and the average image data size in the current shooting mode×15 images for bracketing.

The captured image data size used to calculate the number of shootable images is held in each of the digital cameras 401 to 403 for each shooting mode.

Operations such as connection of a digital camera to a portable remote storage 313, storage, change of the continuous shooting mode, deletion, and disconnection will be described in detail with reference to sequence charts. Processes by the portable remote storage 313 are implemented by software programs running on a CPU 114. Programs to be executed are stored in a flash ROM 109 of the portable remote storage 313 and expanded in a DRAM 108. Processes by the digital camera are implemented by executing firmware programs loaded from a flash ROM 209 by a CPU 214 using a DRAM 208 as a main memory.

A sequence when digital camera 1 is connected to the portable remote storage 313 will be explained with reference to FIG. 31.

Digital camera 1 requests a storage controller 302 to connect digital camera 1 (S1000). At this time, digital camera 1 notifies the storage controller 302 of the size of a spare area necessary for digital camera 1, i.e., corresponding to the current shooting mode.

Upon receiving the connection request from digital camera 1, the storage controller 302 requests a disk manager 310 to allocate a spare area having the designated capacity (step 1001). That is, the storage controller 302 requests the disk manager 310 to allocate a spare area in response to establishment of communication with digital camera 1.

The disk manager 310 allocates a spare area having the designated capacity, i.e., a spare area corresponding to the current shooting mode, and generates an image storage folder for digital camera 1. The disk manager 310 calculates the remaining area of the shared area after assigning the spare area (step 1002), and notifies the storage controller 302 of the calculated remaining area of the shared area (step 1003).

The storage controller 302 notifies digital camera 1 of the completion of connection and the remaining area of the shared area (step 1004). The storage controller 302 also notifies digital camera 2 serving as another connected camera of the remaining area of the shared area (step 1007). Steps 1004 and 1007 are processing examples of a transmission means according to the present invention.

Digital camera 1 calculates the number of shootable images as follows (step 1005), and displays it on a display device 222 (step 1006):

Number of shootable images=(current capacity of spare area of digital camera 1+notified remaining area of shared area)÷captured image data size in current shooting mode If allocation of the spare area fails, the storage controller 302 notifies digital camera 1 of the shooting inhibition mode, i.e., that no image can be stored.

When notified of the remaining area of the shared area, digital camera 2 connected to the portable remote storage 313 similarly calculates the number of shootable images (step 1008), and displays it on the display device 222 (step 1009).

A sequence when digital camera 1 shoots and stores an image will be explained with reference to FIG. 33. When digital camera 1 shoots an image (step 1020), it requests the storage controller 302 to store the shot image, and transmits the image (step 1021). Upon receiving the storage request, the storage controller 302 notifies the disk manager 310 of the storage request and image (step 1022). The disk manager 310 stores the image and calculates the remaining area of the shared area (step 1023). The disk manager 310 notifies the storage controller 302 of the calculated remaining area of the shared area (step 1003).

The storage controller 302 notifies digital camera 1 of the completion of storage and the remaining area of the shared area (step 1004). The storage controller 302 also notifies digital camera 2 serving as another connected camera of the remaining area of the shared area (step 1007). This notification is updated every time an image is stored.

Digital camera 1 calculates the number of shootable images as follows (step 1005), and displays it on the display device 222 (step 1006):

Number of shootable images=(current capacity of spare area of digital camera 1+notified remaining area of shared area)÷captured image data size in current shooting mode When notified of the remaining area of the shared area, digital camera 2 connected to the portable remote storage 313 similarly calculates the number of shootable images (step 1008), and displays it on the display device 222 (step 1009).

A sequence when digital camera 1 changes the continuous shooting mode will be explained with reference to FIG. 32. Digital camera 1 notifies the storage controller 302 of the size of the spare area, and requests change of the continuous shooting mode (step 1010).

The notified size of the spare area is the average image data size in the current shooting mode×5 images for single shooting, the buffer size for continuous shooting, and the average image data size in the current shooting mode×15 images for bracketing.

The storage controller 302 requests the disk manager 310 to allocate the spare area of digital camera 1 again at the designated size (step 1011).

The disk manager 310 allocates the spare area again at the designated size, calculates the remaining area of the shared area (step S1012), and notifies the storage controller 302 of the remaining area of the shared area (step S1003).

The storage controller 302 notifies digital camera 1 of the completion of changing the continuous shooting mode and the remaining area of the shared area (step 1004). The storage controller 302 also notifies digital camera 2 serving as another connected camera of the remaining area of the shared area (step 1007).

Digital camera 1 calculates the number of shootable images as follows (step 1005), and displays it on the display device 222 (step 1006):

Number of shootable images=(current capacity of spare area of digital camera 1+notified remaining area of shared area)÷captured image data size in current shooting mode If allocation of the spare area fails, the storage controller 302 notifies digital camera 1 of the shooting inhibition mode.

When notified of the remaining area of the shared area, digital camera 2 connected to the portable remote storage 313 similarly calculates the number of shootable images (step 1008), and displays it on the display device 222 (step 1009).

A sequence when captured image data is deleted from digital camera 1 will be explained with reference to FIG. 34. Digital camera 1 requests the storage controller 302 to delete image data (step 1030). The storage controller 302 issues the delete request to the disk manager 310 (step 1031). The disk manager 310 deletes the designated image data, deallocates the area, and calculates the remaining area of the shared area (step 1032).

If there is a digital camera whose spare area cannot be allocated (digital camera is in the shooting inhibition state), the disk manager 310 ensures the spare area of the digital camera from the deallocated area. Then, the disk manager 310 notifies the storage controller 302 of the remaining area of the shared area.

If there is no digital camera whose spare area cannot be allocated, the disk manager 310 adds the deallocated area to the shared area, and notifies the storage controller 302 of the updated remaining area of the shared area (step 1003).

The storage controller 302 notifies digital camera 1 of the completion of deletion and the remaining area of the shared area (step 1004). The storage controller 302 also notifies digital camera 2 serving as another connected camera of the remaining area of the shared area (step 1007).

Digital camera 1 calculates the number of shootable images as follows (step 1005), and displays it on the display device 222 (step 1006):

Number of shootable images=(current capacity of spare area of digital camera 1+notified remaining area of shared area)÷captured image data size in current shooting mode When notified of the remaining area of the shared area, digital camera 2 connected to the portable remote storage 313 similarly calculates the number of shootable images (step 1008), and displays it on the display device 222 (step 1009).

A sequence when digital camera 1 is disconnected from the portable remote storage 313 will be explained with reference to FIG. 35. Digital camera 1 requests the storage controller 302 to disconnect digital camera 1 (step 1040).

The storage controller 302 issues the disconnection request to the disk manager 310 (step 1041). The disk manager 310 deallocates the spare area of digital camera 1, and calculates the remaining area of the shared area (step 1042).

If there is a digital camera whose spare area cannot be allocated (digital camera is in the shooting inhibition state), the disk manager 310 allocates the spare area of the digital camera from the deallocated area. Then, the disk manager 310 notifies the storage controller 302 of the remaining area of the shared area.

If there is no digital camera whose spare area cannot be allocated, the disk manager 310 adds the deallocated area to the shared area, and notifies the storage controller 302 of the updated remaining area of the shared area (step 1003). The storage controller 302 notifies digital camera 1 of the completion of disconnection (step 1044). The storage controller 302 notifies digital camera 2 serving as another connected camera of the remaining area of the shared area (step 1007).

When notified of the remaining area of the shared area, digital camera 2 calculates the number of shootable images as follows (step 1008), and displays it on the display device 222 (step 1009):

Number of shootable images=(current capacity of spare area of digital camera 2+notified remaining area of shared area)÷captured image data size in current shooting mode In the sixth embodiment, the portable remote storage 313 transmits the remaining area of the shared area to a digital camera. The digital camera calculates the number of shootable images by adding the capacity of an assigned spare area and the remaining area of the shared area. As a modification to the sixth embodiment, the portable remote storage 313 may transmit, to a digital camera, the remaining area of the shared area and the capacity of a spare area assigned to the digital camera. In this case, each digital camera can calculate the number of shootable images on the basis of the remaining area of the shared area and the capacity of the spare area which are transmitted from the portable remote storage 313.

In the sixth embodiment, each digital camera calculates the number of shootable images, and may also calculate the image recording time. This can be achieved by holding, on the digital camera side, for example, the standard moving image data size per second corresponding to each shooting mode.

In the sixth embodiment, the portable remote storage 313 does not calculate the number of shootable images of each digital camera, and the like. As a modification to the sixth embodiment, it is also possible to calculate the number of shootable images and the like by each digital camera, similar to the sixth embodiment, and calculate the number of shootable images of each digital camera, and the like even by the portable remote storage 313. The display device 122_1 of the portable remote storage 313 may also display the calculation result. This is achieved by executing the processing described in the first embodiment by the portable remote storage 313 using the captured image data size table also described in the first embodiment.

In the sixth embodiment and its modifications, the portable remote storage 313 transmits, to a plurality of digital cameras, information containing the remaining area of the shared area that is assignable to them. Each digital camera can calculate a data amount storable in the portable remote storage 313 on the basis of the remaining area of the shared area. This can reduce the load on the portable remote storage 313, and achieve an efficient design of the overall system. Since each digital camera can calculate data recordable in the portable remote storage 313, it can accurately calculate a data amount recordable in the portable remote storage 313 in accordance with a setting change of the digital camera or the like.

In the modifications to the sixth embodiment, at least either the number of shootable images or the image recording time in a target shooting mode is calculated. Hence, a plurality of digital cameras need not periodically inquire the remaining area of the portable remote storage 313, the number of recordable images, and the like, decreasing the load on the digital cameras.

In the sixth embodiment and its modifications, a plurality of digital cameras are assigned spare areas. This can prevent a data storage failure caused by the time lag of, e.g., a shootable image count notification from the portable remote storage 313.

The objects of the present invention are also achieved by supplying a storage medium which stores software program codes for implementing the functions of the above-described embodiments to a system or apparatus, and reading out and executing the program codes from the storage medium by the computer of the system or the like.

In this case, the program codes read out from the storage medium implement the functions of the above-described embodiments, and the program codes and the storage medium which stores the program codes constitute the present invention.

The storage medium for supplying the program codes includes a flexible disk, hard disk, optical disk, magnetooptical disk, CD-ROM, CD-R, magnetic tape, nonvolatile memory card, and ROM.

The present invention also includes a case where an OS or the like running on the computer performs some or all of actual processes on the basis of the instructions of the program codes read out by the computer and thereby implements the functions of the above-described embodiments.

Furthermore, the present invention includes a case where after the program codes read out from the storage medium are written in the memory of, e.g., a function expansion unit connected to the computer, the CPU or the like performs actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243039, filed Sep. 7, 2006, and Japanese Patent Application No. 2007-058813, filed Mar. 8, 2007, which are hereby incorporated by reference herein in their entirety.

What is claimed is:

1. A recording apparatus capable of communicating with a plurality of communication apparatuses, the apparatus comprising:

a communication unit capable of communicating with the plurality of communication apparatuses;

a storage unit which stores data received by said communication unit;

a management unit which manages exclusive storage areas and a shared storage area in said storage unit, wherein each of said exclusive storage areas is assigned only one communication apparatus, wherein said shared storage area is commonly available for the plurality of communication apparatuses, wherein the exclusive storage areas are used in a case that a capacity of the shared storage area becomes short; and a transmission unit which transmits information on a data amount storable in said storage unit to communication units of the plurality of communication apparatuses, wherein the information on the data amount storable in said storage unit that is transmitted to the communication apparatuses includes information based on a remaining area of the shared storage area commonly available for the plurality of communication apparatuses.

2. The apparatus according to claim 1, wherein the information on the data amount storable in said storage unit that is transmitted to each communication apparatus includes information obtained by adding a capacity of the exclusive storage area assigned to the communication apparatus at an information destination to the remaining area of the shared storage area.

3. The apparatus according to claim 1, wherein the exclusive storage area is assigned to the communication apparatus in response to establishment of communication between the communication apparatus and the recording apparatus.

4. The apparatus according to claim 1, further comprising an assignment unit which assigns the exclusive storage area to each communication apparatus in accordance with a shooting mode of the communication apparatus.

5. The apparatus according to claim 1, wherein said transmission unit transmits the information on the data amount storable in said storage unit that is updated every time data is stored in said storage unit.

6. The apparatus according to claim 4, further comprising a calculation unit which calculates at least either of the number of shootable images in the shooting mode and an image recording time on the basis of the data amount storable in said storage unit.

7. The apparatus according to claim 6, further comprising a display control unit which controls a display unit to display at least either of the number of shootable images and the image recording time calculated by said calculation unit.

8. The apparatus according to claim 6, wherein said calculation unit calculates at least either of the number of shootable images and the image recording time for each communication apparatus by using a data size table which holds at least either of a data size per unit image count and a data size per unit recording time for each communication apparatus.

9. The apparatus according to claim 3, further comprising a notification unit which, when the exclusive storage area is not assigned in response to establishment of communication between the communication apparatus and the recording apparatus, notifies, that data cannot be stored in said storage unit, the communication apparatus to which the exclusive storage area is not assigned.

10. A method of controlling a recording apparatus capable of communicating with a plurality of communication apparatuses, the method comprising the steps of:
 allowing communication with the plurality of communication apparatuses;
 managing exclusive storage areas and a shared storage area in a storage unit, wherein each of said exclusive storage areas is assigned only one communication apparatus, wherein said shared storage area is commonly available for the plurality of communication apparatuses, wherein the exclusive storage areas are used in a case that a capacity of the shared storage area becomes short; and
 transmitting, to communication units of the plurality of communication apparatuses, information on a data amount storable in the storage unit which stores data received by the communication units,
 wherein the information on the data amount storable in the storage unit that is transmitted to the communication apparatuses includes information based on a remaining area of the shared storage area commonly available for the plurality of communication apparatuses.

\* \* \* \* \*